US011859054B2

(12) United States Patent
Courtemanche et al.

(10) Patent No.: US 11,859,054 B2
(45) Date of Patent: Jan. 2, 2024

(54) METHOD OF PREPARING ALKOXY-FUNCTIONAL ORGANOSILICON COMPOUNDS

(71) Applicant: DOW SILICONES CORPORATION, Midland, MI (US)

(72) Inventors: Marc-André Courtemanche, Midland, MI (US); Michael Salvatore Ferritto, Midland, MI (US); Nisaraporn Suthiwangcharoen, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 61 days.

(21) Appl. No.: 17/640,987

(22) PCT Filed: Sep. 9, 2020

(86) PCT No.: PCT/US2020/049817
§ 371 (c)(1),
(2) Date: Mar. 7, 2022

(87) PCT Pub. No.: WO2021/050463
PCT Pub. Date: Mar. 18, 2021

(65) Prior Publication Data
US 2022/0340714 A1 Oct. 27, 2022

Related U.S. Application Data

(60) Provisional application No. 62/897,705, filed on Sep. 9, 2019.

(51) Int. Cl.
| | |
|---|---|
| *C08G 77/18* | (2006.01) |
| *C07F 7/18* | (2006.01) |
| *C08G 77/388* | (2006.01) |
| *C08G 77/26* | (2006.01) |
| *C08G 77/08* | (2006.01) |
| *C08L 83/08* | (2006.01) |

(52) U.S. Cl.
CPC ............ *C08G 77/18* (2013.01); *C07F 7/1804* (2013.01); *C07F 7/188* (2013.01); *C08G 77/08* (2013.01); *C08G 77/26* (2013.01); *C08G 77/388* (2013.01); *C08L 83/08* (2013.01)

(58) Field of Classification Search
CPC .............................. C07F 7/188; C08G 77/388
USPC .................. 556/436–438, 440, 441
See application file for complete search history.

(56) References Cited

U.S. PATENT DOCUMENTS

| | | | |
|---|---|---|---|
| 3,160,601 A | 12/1964 | Hyde | |
| 3,294,717 A | 12/1966 | Krantz | |
| 3,647,846 A | 3/1972 | Hartlein et al. | |
| 3,761,444 A | 9/1973 | Mendicino | |
| 3,997,496 A | 12/1976 | Razzano | |
| 4,102,941 A | 7/1978 | LaRochelle | |
| 4,208,503 A | 6/1980 | Martin | |
| 4,486,567 A | 12/1984 | Bowman et al. | |
| 4,508,887 A | 4/1985 | Kohl | |
| 4,525,470 A | 6/1985 | Kohl | |
| 4,588,830 A * | 5/1986 | Fisk ............... | C08F 299/024 558/186 |
| 5,073,618 A | 12/1991 | Westall | |
| 5,109,094 A | 4/1992 | Rees et al. | |
| 5,154,759 A * | 10/1992 | Cifuentes ............ | C08G 77/54 106/11 |
| 5,344,906 A | 9/1994 | Westall | |
| 5,650,474 A | 7/1997 | Yamaya et al. | |
| 5,814,703 A | 9/1998 | Yamaya et al. | |
| 5,883,214 A | 3/1999 | Wipfelder et al. | |
| 5,914,382 A | 6/1999 | Friebe et al. | |
| 6,403,749 B1 | 6/2002 | Miyake et al. | |
| 6,864,340 B2 | 3/2005 | Levandoski et al. | |
| 7,098,178 B2 | 8/2006 | Gerke et al. | |
| 7,118,621 B2 | 10/2006 | Gerritsen et al. | |
| 7,238,768 B2 | 7/2007 | Hupfield et al. | |

(Continued)

FOREIGN PATENT DOCUMENTS

| | | |
|---|---|---|
| CN | 106543734 A | 3/2017 |
| CN | 106634409 A | 5/2017 |

(Continued)

OTHER PUBLICATIONS

Machine translation of JP 2019-517554 (no date).*
International Search Report for PCT/US2020/049819 dated Nov. 20, 2020, 4 pages.
International Search Report for PCT/US2020/049817 dated Dec. 15, 2020, 4 pages.
Machine assisted English translation of CN106543734 obtained from https://patents.google.com/patent on Apr. 26, 2022, 11 pages.

(Continued)

*Primary Examiner* — Marc S Zimmer
(74) *Attorney, Agent, or Firm* — Warner Norcross + Judd LLP

(57) ABSTRACT

A method of preparing an alkoxy-functional organosilicon compound is provided. The method comprises reacting (A) an initial organosilicon compound and (B) an alcohol component in the presence of (C) a catalyst, thereby preparing the alkoxy-functional organosilicon compound. The initial organosilicon compound (A) comprises at least one alkoxysilyl group. The alcohol component (B) comprises an organic alcohol. The catalyst (C) comprises (C1) an ammonium carboxylate compound or (C2) a titanate compound. A reaction product comprising an alkoxy-functional organosilicon compound prepared in accordance with the method, and a composition comprising the reaction product, are also provided. The alkoxy-functional organosilicon compound, and the reaction product and composition comprising the same, are prepared in increased purity under functional group-tolerant conditions.

13 Claims, No Drawings

(56) References Cited

U.S. PATENT DOCUMENTS

| | | | |
|---|---|---|---|
| 7,307,134 B2 * | 12/2007 | Lim | C08L 83/04 528/34 |
| 7,534,901 B2 | 5/2009 | Crivello | |
| 8,603,962 B2 | 12/2013 | Bastigkeit et al. | |
| 8,680,040 B2 | 3/2014 | Huchel et al. | |
| 9,175,139 B2 | 11/2015 | McCormack et al. | |
| 9,321,986 B2 | 4/2016 | Bauer et al. | |
| 9,587,206 B2 | 3/2017 | Bauer et al. | |
| 10,099,194 B2 | 10/2018 | Lei et al. | |
| 2006/0160711 A1 | 7/2006 | Frank | |
| 2006/0165740 A1 | 7/2006 | Frank | |
| 2009/0099382 A1 | 4/2009 | Gerke et al. | |
| 2010/0041910 A1 | 2/2010 | Schubert et al. | |
| 2013/0154473 A1 | 6/2013 | Kaneko et al. | |
| 2016/0137674 A1 | 5/2016 | Panandiker et al. | |
| 2016/0213598 A1 | 7/2016 | Oh et al. | |
| 2018/0112066 A1 * | 4/2018 | Krafczyk | C08C 19/25 |

FOREIGN PATENT DOCUMENTS

| | | |
|---|---|---|
| DE | 19841147 A1 | 3/2000 |
| EP | 2093244 B1 | 8/2009 |
| GB | 1511508 A | 5/1978 |
| JP | 2014047211 A | 3/2014 |
| JP | 2019-517554 A * | 6/2019 |
| WO | 1999021532 A1 | 5/1999 |
| WO | 2007128326 A1 | 11/2007 |
| WO | 2016077513 A1 | 5/2016 |
| WO | 2016144677 A1 | 9/2016 |

OTHER PUBLICATIONS

Machine assisted English translation of CN106634409 obtained from https://patents.google.com/patent on Apr. 26, 2022, 8 pages.
Machine assisted English translation of DE19841147A obtained from https://patents.google.com/patent on Jul. 5, 2022, 14 pages.
Machine assisted English translation of JP2014047211 obtained from https://patents.google.com/patent on Jul. 5, 2022, 6 pages.

* cited by examiner

METHOD OF PREPARING ALKOXY-FUNCTIONAL ORGANOSILICON COMPOUNDS

CROSS REFERENCE TO RELATED APPLICATIONS

This application is the U.S. National Stage of International Application No. PCT/US2020/049817 filed on 9 Sep. 2020, which claims priority to and all advantages of U.S. Provisional Patent Application No. 62/897,705 filed on 9 Sep. 2019, the content of which is incorporated herein by reference.

FIELD OF THE INVENTION

The present disclosure generally relates to organosilicon compounds and, more specifically, to a method of preparing alkoxy-functional organosilicon compounds and alkoxy-functional organosilicon compounds prepared thereby.

DESCRIPTION OF THE RELATED ART

Organosilicon materials are known in the art and are utilized in myriad end use applications and environments. For example, organopolysiloxanes are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials.

Unfortunately, many methods of preparing hybrid materials require functional organosilicon compounds, which are often difficult and expensive to synthesize and/or utilize. In particular, traditional methods of preparing certain functional organosilicon compounds are often incompatible with many silicone materials and organic materials alike (e.g. via promoting silicone rearrangements, unselective reactions, degradation, hydrolysis and/or unwanted transformation of functional groups, etc.), resulting in decreased yields and purities, and limiting general applicability of such methods. These disadvantages are in part due to the particular catalysts employed in many conventional synthesis methods, such as strong acids and bases, which are known to generate cyclic siloxanes (e.g. via depolymerization of a siloxane backbone). While noble metal-based compounds have also been explored as alternative catalysts, these compounds are also limited in application and increase costs associated with the methods in which they are utilized.

BRIEF SUMMARY OF THE INVENTION

A method of preparing an alkoxy-functional organosilicon compound is provided. The method comprises reacting (A) an initial organosilicon compound and (B) an alcohol component in the presence of (C) a catalyst, thereby preparing the alkoxy-functional organosilicon compound. The initial organosilicon compound (A) comprises at least one alkoxysilyl group. The alcohol component (B) comprises an organic alcohol. The catalyst (C) comprises (C1) an ammonium carboxylate compound or (C2) a titanate compound.

A reaction product comprising an alkoxy-functional organosilicon compound prepared in accordance with the method is also provided.

A composition comprising the alkoxy-functional organosilicon compound or the reaction product comprising the same is also provided.

DETAILED DESCRIPTION OF THE INVENTION

A method of preparing alkoxy-functional organosilicon compounds is disclosed. The alkoxy-functional organosilicon compounds prepared may be utilized in diverse end use applications. For example, the alkoxy-functional organosilicon compounds may be utilized as a starting component and/or precursor when preparing silicone-organic hybrid materials, e.g. via copolymerization, grafting, etc. The alkoxy-functional organosilicon compounds may also be utilized in a composition or formulation, as provided herein.

The method comprises reacting (A) an initial organosilicon compound having at least one alkoxysilyl group and (B) an alcohol component comprising an organic alcohol in the presence of (C) a catalyst comprising (C1) an ammonium carboxylate compound or (C2) a titanate compound. In general, reacting the initial organosilicon compound (A) and the alcohol component (B) comprises combining the initial organosilicon compound (A) and the alcohol component (B) in the presence of the catalyst (C). Said differently, there is generally no proactive step required for the reaction beyond combining the initial organosilicon compound (A) and the alcohol component (B) in the presence of the catalyst (C). As will be appreciated by those of skill in the art, the reaction may be generally defined or otherwise characterized as a transalkoxylation reaction or, more simply, a "transalkoxylation" or "alkoxylation", e.g. a selective alkoxylation reaction, a catalytic alkoxylation reaction, an alkoxyltic conversion reaction, etc.

The initial organosilicon compound (A) is an organosilicon compound having at least one alkoxysilyl group, and is otherwise not particularly limited.

In general, the alkoxysilyl group of the initial organosilicon compound (A) has the formula:

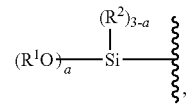

where each $R^1$ and each $R^2$ is an independently selected hydrocarbyl group; and subscript a is 1, 2, or 3.

Each $R^1$ and each $R^2$ is independently selected from hydrocarbyl groups. However, as will be appreciated from the description herein, each $R^1$ and each $R^2$ may comprise a combination of such hydrocarbyl groups, e.g. as substituents of one another. As such, suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., $R^1$ and/or $R^2$ may include one or more heteroatoms (oxygen, sulfur, nitrogen, etc.) within a carbon chain), or both. As such, it will be appreciated that $R^1$ and/or $R^2$ may include hydrocarbon moieties that have substituents in and/or on (i.e., appended to and/or integral with) carbon chains/backbones thereof, such that $R^1$ and/or $R^2$ may comprise or be an ether, an ester, etc.

Hydrocarbyl groups suitable for $R^1$ and/or $R^2$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. isopropyl and/or n-propyl), butyl (e.g. isobutyl, n-butyl, tert-butyl, and/or sec-butyl), pentyl (e.g., isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each $R^1$ and each $R^2$ is an independently selected substituted or unsubstituted hydrocarbyl group.

Each $R^1$ may be the same as or different from any other $R^1$ in the initial organosilicon compound (A). In certain embodiments, each $R^1$ is the same. In other embodiments, at least one $R^1$ is different from at least one other $R^1$ of the initial organosilicon compound (A). In some embodiments, each $R^1$ is an independently selected hydrocarbyl group having from 1 to 18, alternatively from 1 to 12, alternatively from 1 to 6, alternatively from 1 to 4 carbon atoms. Typically, each $R^1$ is independently selected from alkyl groups, such as methyl groups, ethyl groups, etc. In certain embodiments, each $R^1$ is methyl.

Each $R^2$ may be the same as or different from any other $R^2$ in the initial organosilicon compound (A). In certain embodiments, each $R^2$ is the same. In other embodiments, at least one $R^2$ is different from at least one other $R^2$ of the initial organosilicon compound (A). In some embodiments, each $R^2$ is typically an independently selected substituted or unsubstituted hydrocarbyl group having from 1 to 20, alternatively from 1 to 18, alternatively from 1 to 16 carbon atoms.

Subscript a is 1, 2, or 3, such that the initial organosilicon compound (A) comprises a monoalkoxysilyl group, dialkoxysilyl group, or trialkoxysilyl group, respectively. In particular embodiments, subscript a is 3, such that the initial organosilicon compound (A) comprises at least one trialkoxysilyl group.

As introduced above, the initial organosilicon compound (A) is not particularly limited aside from the alkoxysilyl group. In some embodiments, however, the initial organosilicon compound (A) has the general formula:

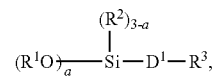

where $R^1$, $R^2$, and subscript a are as defined above, $D^1$ is a divalent linking group, and $R^3$ is an independently selected hydrocarbyl group.

In general, $D^1$ is a divalent linking group, and may be linear or branched and substituted or unsubstituted. When branched, $D^1$ may optionally be bonded (e.g. cross-linked) to a siloxane segment or a silane moiety (i.e., other than the alkoxysilyl group in the general initial organosilicon compound formula above). Typically, $D^1$ is selected from divalent substituted or unsubstituted hydrocarbon groups, which may optionally be modified or substituted, e.g. with ether, ester, siloxy, and/or silyl groups. For example, in some embodiments, $D^1$ comprises a hydrocarbon moiety having the formula $—(CH_2)_c—$, where subscript c is from 1 to 16. In these or other embodiments, $D^1$ may comprise a substituted hydrocarbon, i.e., a hydrocarbon group comprising a backbone having at least one heteroatom (e.g. O, N, S, etc.). For example, in some embodiments, $D^1$ is a hydrocarbon having a backbone comprising an ether moiety.

$R^3$ is an independently selected hydrocarbyl group, such as any of those described above. Typically, $R^3$ is an independently selected substituted hydrocarbyl group. For example, in particular embodiments, $R^3$ comprises at least one functional group, and may thus be referred to as a functional moiety (i.e., the functional moiety $R^3$). In some such embodiments, the functional group is selected from epoxide groups, ester groups, anhydride groups, and acryloxy groups. As such, in these embodiments, $R^3$ comprises an epoxide group, an ester group, an anhydride group, and/or an acryloxy group. In certain embodiments, $R^3$ comprises, alternatively is, an epoxide group, an ester group, an anhydride group, or an acryloxy group.

For example, in certain embodiments, $R^3$ comprises, alternatively is, an epoxyethyl group of the following formula:

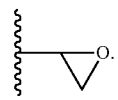

In some embodiments, $R^3$ comprises, alternatively is, an epoxycyclohexyl group of the following formula:

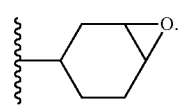

In particular embodiments, $R^3$ may comprise, alternatively may be, a 3-glycidoxypropyl group, a 4-glycidoxybutyl group, or similar glycidoxyalkyl groups; a 2-(3,4- epoxycyclohexyl)ethyl group, a 3-(3,4-epoxycyclohexyl) propyl group, or similar epoxycyclohexylalkyl groups; and a 4-oxiranylbutyl group, an 8-oxiranyloctyl group.

In certain embodiments, $R^3$ comprises, alternatively is, an alkyl glycidyl ether group, such as a methyl glycidyl ether group, ethyl glycidyl ether group, propyl glycidyl ether group, etc. In some embodiments, $R^3$ comprises, alternatively is, an epoxycyclohexylalkyl group, such as an epoxycyclohexylmethyl group, an epoxycyclohexylethyl group, an epoxycyclohexylpropyl group, etc.

In some embodiments, $R^3$ comprises, alternatively is, an acryloxy group of the formula:

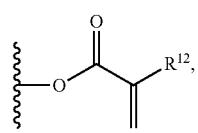

where $R^{12}$ is independently selected from hydrocarbyl groups and H. Examples of hydrocarbyl groups suitable for $R^{12}$ include any of those described above. In certain embodiments, $R^{12}$ is H, such that $R^3$ comprises an acryloxy group that may be defined as an acrylate group. In other embodiments, $R^{12}$ is selected from substituted or unsubstituted hydrocarbyl groups. In some such embodiments, $R^{12}$ is an alkyl group, such that $R^3$ comprises, alternatively is, an alkylacrylate group. In specific embodiments, $R^{12}$ is methyl, such that $R^3$ comprises, alternatively is, a methacrylate group.

In some embodiments, $R^3$ comprises, alternatively is, an ester group. For example, in some such embodiments, $R^3$ comprises, alternatively is, an ester group of the formula:

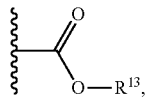

where $R^{13}$ is an independently selected hydrocarbyl group. Examples of hydrocarbyl groups suitable for $R^{13}$ include any of those described above. In some embodiments, $R^{13}$ is selected from substituted or unsubstituted hydrocarbyl groups. In some such embodiments, $R^{13}$ is an alkyl group, such that $R^3$ comprises, alternatively is, an alkyl ester group. In specific embodiments, $R^{13}$ is methyl, ethyl, or propyl, such that $R^3$ comprises, alternatively is, a methyl ester group, an ethyl ester group, or a propyl ester group, respectively.

In certain embodiments, $R^3$ comprises, alternatively is, an anhydride group. The anhydride group may comprise saturated or unsaturated substituents, and may be linear or cyclic.

In certain embodiments, the method comprises utilizing more than one initial organosilicon compound (A), such as 2, 3, 4, or more initial organosilicon compounds (A). In such embodiments, each initial organosilicon compound (A) is independently selected, and may be the same as or different from any other initial organosilicon compound (A).

The initial organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. When utilized, the carrier vehicle will be selected based on the particular components of the reaction, such as the particular initial organosilicon compound (A) selected. For example, in certain embodiments, the method is carried out in the presence of a carrier vehicle or solvent comprising a polar component, such as an ether, acetonitrile, dimethylformamide, dimethylsulfoxide, and the like, or combinations thereof. In some embodiments, the carrier vehicle may comprise a halogenated hydrocarbon, such as those described above. In such embodiments, the carrier vehicle in general, and/or the halogenated hydrocarbon in particular, is typically purified and/or processes to reduce, alternatively to remove, any hydrochloric acid (HCl) therefrom. It will be appreciated that the initial organosilicon compound (A) may be combined with the carrier vehicle, if utilized, prior to, during, or after being combined with components (B) and (C).

In certain embodiments, the initial organosilicon compound (A) is free from, alternatively substantially free from carrier vehicles. In some such embodiments, the initial organosilicon compound (A) is free from, alternatively substantially free from, water and carrier vehicles/volatiles reactive with the initial organosilicon compound (A), the alcohol component (B) (e.g. the organic alcohol thereof), and/or the catalyst (C). In some embodiments, the method is carried out in the absence of carrier vehicles/volatiles that are reactive with the initial organosilicon compound (A), the alcohol component (B), and/or the catalyst (C). For example, in certain embodiments, the method may comprise stripping a mixture of the initial organosilicon compound (A) of volatiles and/or solvents prior to combining the same with components (B) and/or (C). Techniques for stripping the initial organosilicon compound (A) are known in the art, and may include heating, drying, applying reduced pressure/vacuum, azeotroping with solvents, utilizing molecular sieves, etc., and combinations thereof.

The initial organosilicon compound (A) may be utilized in any amount, which will be selected by one of skill in the art, e.g. dependent upon the particular catalyst (C) selected, the reaction parameters employed, the scale of the reaction (e.g. total amounts of component (A) to be reacted and/or alkoxy-functional organosilicon compound to be prepared), etc.

The alcohol component (B) comprises an organic alcohol, and is otherwise not particularly limited. As will be appreciated by one of skill in the art, the organic alcohol is also not particularly limited, but will be selected in view of the particular initial organosilicon compound (A) utilized, including the boiling point and/or other properties of the conjugate acids of the individual alkoxides of the alkoxysilyl group to be transalkoxylated with the organic alcohol of the alcohol component (B).

Typically, the organic alcohol of the alcohol component (B) has the formula $R^4OH$, where $R^4$ is an independently selected hydrocarbyl group. Examples of hydrocarbyl groups suitable for $R^4$ include any of those described above. For example, in certain embodiments, $R^4$ is selected from substituted and unsubstituted hydrocarbyl groups. In some such embodiments, $R^4$ is a substituted or unsubstituted hydrocarbyl group having at least 3, alternatively at least 4, alternatively at least 5, alternatively at least 6, alternatively greater than 6 carbon atoms. In particular embodiments, $R^4$ is an independently selected hydrocarbyl group having from 3 to 30, alternatively from 3 to 28, alternatively from 3 to 26, alternatively from 3 to 24, alternatively from 3 to 22, alternatively from 4 to 22, alternatively from 5 to 22, alternatively from 6 to 22, alternatively from 6 to 20 carbon atoms.

In general, as will be appreciated by those of skill in the art, $R^4$ is different from $R^1$ of the alkoxysilyl group of the initial organosilicon compound (A) to facilitate the transalkoxylation reaction. The difference between $R^4$ and $R^1$ may be selected, e.g. to increase the ease of purifying the alkoxy-functional organosilicon compound to be prepared (i.e., with regard to removal of alcohol of formula $R^1OH$ produced during the reaction, via distillation, evaporation, etc.), as described below. For example, in certain embodiments, $R^4$ is selected to have at least 1, alternatively at least 2, alternatively at least 3, alternatively at least 4 more carbon atoms than $R^1$ of the alkoxysilyl group of the initial organosilicon compound (A). In these or other embodiments, $R^4$ and $R^1$ are cooperatively selected such that the organic alcohol has a higher boiling point and/or lower vapor pressure than the alcohol of formula $R^1OH$ produced during the transalkoxylation reaction.

Examples of suitable organic alcohols include 2,2-dimethyl-3-(3-methylphenyl)-1-propanol, 2,2-dimethyl-3-phenyl-1-propanol, 3-(2-bornyloxy)2-methyl-1-propanol, 2-tert-butylcyclohexanol, 4-tert-butylcyclohexanol, dihydroterpineol, 2,4-dimethyl-4-cyclohexen-1-yl methanol, 2,4-dimethylcyclohexyl methanol, 2,6-dimethyl-2-heptanol, 2,6-dimethyl-4-heptanol, 2,6-dimethyl-2,7-octadien-6-ol (linalool), cis-3,7-dimethyl-2,6-octadien-1-ol (nerol), trans-3,7-dimethyl-2,6-octadien-1-ol (geraniol), 1-octanol, 2-octanol, 3,7-dimethyl-1,7-octanediol, 3,7-dimethyl-1-octanol (tetrahydrogeraniol), 2,6-dimethyl-2-octanol (tetrahydromyrcenol), 3,7-dimethyl-3-octanol (tetrahydrolinalool), 2,6-dimethyl-7-octen-2-ol (dihydromyrcenol), 3,7-dimethyl-6-octen-1-ol (citronellol), 3,7-dimethyl-1,6-nonadien-3-ol,1-decanol, 9-decen-1-ol, 2-ethyl-4-(2,2,3-trimethyl-3-cyclopenten-1-yl)-2-buten-1-ol, cis-3-hexen-1-ol, 4-(4-hydroxy-3-methoxyphenyl)-2-butanone, 3-(hydroxymethyl)-2-nonanone, 3a,4,5,6,7,7a-hexahydro-2,4-dimethyl-4,7-methano[H]inden-5-ol, 1-hydroxy-2-(1-methyl-1-hydroxyethyl)-5-methylcyclohexane, 4-hydroxy-3-methoxybenzaldehyde (vanillin), 3-ethoxy-4-hydroxybenzaldehyde (ethylvanillin), 4-(4-hydroxy-4-methylpentyl)-3-cyclohexene-1-carboxaldehyde, isoborneol, 3-isocamphylcyclohexanol, 2-isopropenyl-5-methylcyclohexanol (isopulegol), 1-isopropyl-4-methylcyclohex-3-enol (terpinenol), 4-isopropylcyclohexanol, 1-(4-isopropylcyclohexyl) ethanol, 4-isopropylcyclohexylmethanol, 2-isopropyl-5-methylcyclohexanol (menthol), 2-isopropyl-5-methylphenol (thymol), 5-isopropyl-2-methylphenol (carvacrol), 2-(4-methyl-3-cyclohexenyl)-2-propanol (terpineol), 2-(4-methylcyclohexyl)-2-propanol (dihydroterpineol), benzyl alcohol, 4-methoxybenzyl alcohol, 2-methoxy-4-methylphenol, 3-methoxy-5-methylphenol, 2-ethoxy-4-methoxymethylphenol, 4-allyl-2-methoxyphenol (eugenol), 2-methoxy-4-propenylphenol (isoeugenol), 1-methoxy-4-propenylbenzene (anethol), 4-methyl-3-decen-5-ol, 2-methyl-6-methylene-7-octen-2-ol (myrcenol), 2-methyl-2-butanol (2M2B, tert-amyl alcohol, TAA), 3-methyl-4-phenyl-2-butanol,3-methyl-1-butanol (isoamyl alcohol, isopentyl alcohol) 2-(2-methylphenyl) ethanol, 2-methyl-4-phenyl-1-pentanol, 3-methyl-5-phenyl-1-pentanol, 2-methyl-1-phenyl-2-propanol, (1-methyl-2-(1,2,2-trimethylbicyclo[3.1.0]hex-3-ylmethyl) cyclopropyl) methanol, 3-methyl-4-(2,2,6-trimethylcyclohexen-1-yl)-2-butanol, 2-methyl-4-(2,2,3-trimethyl-3-cyclopenten-1-yl)-2-buten-1-ol, (3-methyl-1-(2,2,3-trimethyl-3-cyclopentenyl)-3-cyclohexen-1-yl) methanol, 3-methyl-5-(2,2,3-trimethyl-3-cyclopenten-1-yl)-4-penten-2-ol, 2-methyl-2-vinyl-5-(1-hydroxy-1-methylethyl) tetrahydrofuran, (2E,6Z)-nona-2,6-dien-1-ol, 1-nonanol, 3,5,5-trimethyl-1-hexanol (isononanol), nopol, 1,2,3,4,4a,5,6,7-octahydro-2,5,5-trimethyl-2-naphthol, 3,4,5,6,6-pentamethyl-2-heptanol, 2-phenylethanol, 2-phenylpropanol, 3-phenylpropanol (hydrocinnamic alcohol), 3-phenyl-2-propen-1-ol (cinnamic alcohol), 4-(5,5,6-trimethylbicyclo[2.2.1]hept-2-yl) cyclohexan-1-ol, 3,5,5-trimethylcyclohexanol, 2,4,6-trimethyl-4-cyclohexen-1-ylmethanol, 5-(2,2,3-trimethyl-3-cyclopentenyl)-3-methylpentan-2-ol, 3,7,11-trimethyl-2,6,10-dodecatrien-1-ol (farnesol), 3,7,11-trimethyl-1,6,10-dodecatrien-3-ol (nerolidol), 1-undecanol, 10-undecen-1-ol, vetiverol, and the like, as well as derivatives, modifications, and combinations thereof. In particular embodiments, the organic alcohol is selected from geraniol, 2E,6Z)-nona-2,6-dien-1-ol, isoamyl alcohol, benzyl alcohol, 2-octanol, and 2-methyl-2-butanol.

In certain embodiments, the organic alcohol of the alcohol component (B) may comprise, alternatively may be, a fragrance alcohol or a nonfragrance alcohol. Typically, the distinction as to whether a particular organic alcohol is considered a fragrance alcohol or a nonfragrance alcohol is based on whether the particular organic alcohol exhibits an odiferous effect detectable by a human nose. However, because the organic alcohol can be considered either a fragrance alcohol and/or a nonfragrance alcohol, such distinction is only relevant, if at all, to the selection of the organic alcohol of the alcohol component (B) by one of skill in the art based on end use applications. In some embodiments, the alcohol component (B) is substantially free from, alternatively free from, a fragrance alcohol. In these or other embodiments, the organic alcohol of the alcohol component (B) is substantially free from, alternatively free from profragrance and/or fragrance precursor groups.

In certain embodiments, the alcohol component (B) comprises more than one organic alcohol, such as 2, 3, 4, or more organic alcohols. In such embodiments, each organic alcohol is independently selected, and may be the same as or different from any other organic alcohol, e.g. in terms of number of carbon atoms, structure (e.g. stereochemistry, etc.), boiling point, vaporization point, vapor pressure, etc.

The organic alcohol of the alcohol component (B) may be utilized in any form, such as neat (i.e., absent solvents, carrier vehicles, diluents, etc.), or disposed in a carrier vehicle, such as a solvent or dispersant. As such, the alcohol component (B) itself may comprise the organic alcohol and other components, such as the carrier vehicle, or may consist essentially of, alternatively consist of, the organic alcohol. The carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. It will be appreciated that the alcohol component (B) may be combined with such a carrier vehicle, if utilized, prior to, during, or after being combined with components (A) and (C). In certain embodiments, the alcohol component (B) itself is utilized as a carrier vehicle for the reaction, e.g. when the organic alcohol is liquid under the reaction conditions employed.

In certain embodiments, the alcohol component (B) is free from, alternatively substantially free from carrier vehicles.

In some such embodiments, the alcohol component (B) is free from, alternatively substantially free from, water and carrier vehicles/volatiles reactive with the alcohol component (B) (e.g. the organic alcohol thereof), the initial organosilicon compound (A), and/or the catalyst (C). For example, in certain embodiments, the method may comprise stripping the alcohol component (B) of volatiles (i.e., aside from the organic alcohol, if volatile) and/or solvents (e.g. water, reactive solvents, etc.) prior to combining the same with components (A) and/or (C). Techniques for stripping the alcohol component (B) are known in the art, and may include heating, drying, applying reduced pressure/vacuum, azeotroping with solvents, utilizing molecular sieves, etc., and combinations thereof.

The alcohol component (B) may be utilized in any amount, which will be selected by one of skill in the art, e.g. dependent upon the particular initial organosilicon compound (A) selected, the particular catalyst (C) selected, the reaction parameters employed, the scale of the reaction (e.g. total amounts of component (A) to be converted and/or alkoxy-functional organosilicon compound to be prepared), etc.

The relative amounts of the initial organosilicon compound (A) and the alcohol component (B) utilized may vary, e.g. based upon the particular initial organosilicon compound (A) selected, the particular organic alcohol of component (B) selected, the reaction parameters employed, etc. As understood by those of skill in the art, the transalkoxylation of the initial organosilicon compound (A) with the organic alcohol of the alcohol component (B) occurs at a theoretical maximum based on the number of alkoxysilyl functionalities present within the initial organosilicon compound (A). In particular, with reference to the general alkoxysilyl group above, each alkoxy group designated by subscript a can be transalkoxylated, such that one molar equivalent of the organic alcohol of the alcohol component (B) is needed for every alkoxysilyl group of the initial organosilicon compound (A). In this fashion, when the initial organosilicon compound (A) comprises a single alkoxysilyl group where subscript a is 3, the transalkoxylation of the initial organosilicon compound (A) with the organic alcohol of the alcohol component (B) occurs at a theoretical maximum molar ratio of 1:3 (A):(B), where (B) is the organic alcohol of the alcohol component (B). Likewise, when the initial organosilicon compound (A) comprises two alkoxysilyl groups where each subscript a is 2, the transalkoxylation of the initial organosilicon compound (A) with the organic alcohol of the alcohol component (B) occurs at a theoretical maximum molar ratio of 1:4 (A):(B), where (B) is the organic alcohol of the alcohol component (B).

Typically, however, an excess (e.g. molar and/or stoichiometric) of one of the components is utilized to fully consume the initial organosilicon compound (A) or the organic alcohol of the alcohol component (B), e.g. to simplify purification of the reaction product formed. For example, in certain embodiments, the alcohol component (B) is utilized in relative excess (e.g. where the organic alcohol is present in a molar excess of the number of silicon-bonded alkoxy groups of the initial organosilicon compound (A)) to maximize a conversion rate of the initial organosilicon compound (A) to the alkoxy-functional organosilicon compound. In some such embodiments, the alcohol component (B) may also be utilized, or otherwise function, as a carrier vehicle in the reaction. It will be appreciated that the initial organosilicon compound (A) may be used in excess of the organic alcohol of the alcohol component (B), such as when maximum consumption of the organic alcohol is desired.

In general, the initial organosilicon compound (A) and the organic alcohol of the alcohol component (B) are typically reacted in a molar ratio of from 10:1 to 1:10 (A):(B). In certain embodiments, the initial organosilicon compound (A) and the organic alcohol of the alcohol component (B) are reacted in a molar ratio of from 1:1 to 1:9, such as from 1:2 to 1:9, alternatively of from 1:2 to 1:8, alternatively of from 1:2 to 1:7, alternatively of from 1:3 to 1:7, alternatively of from 1:3.1 to 1:6.1, (A):(B). It will be appreciated that ratios outside of these ranges may be utilized as well. For example, in certain embodiments, the organic alcohol of the alcohol component (B) is utilized in a gross excess (e.g. in an amount of ≥10, alternatively ≥15, alternatively ≥20, times the molar amount of the initial organosilicon compound (A)), such as when the organic alcohol of the alcohol component (B) is utilized as a carrier (i.e., a solvent, diluent, etc.) during the reaction. However, one of skill in the art will readily select the particular ratio of the initial organosilicon compound (A) and the organic alcohol of the alcohol component (B) to be reacted in view of the description above, including with respect to the theoretical maximum ratio of (A):(B) for a particular transalkoxylation according to the method, the presence of any carrier vehicle, the particular initial organosilicon compound (A) utilized (e.g. the nature of the alcohol $R^1OH$ to be formed therefrom), etc.

The catalyst (C) comprises (C1) an ammonium carboxylate compound or (C2) a titanate compound. The particular catalyst (C) utilized is selected in view of the particular initial organosilicon compound (A) to be transalkoxylated. In particular, the selection of the functional group of $R^3$ (e.g. where the initial organosilicon compound comprises the functional moiety $R^3$) will control which particular catalyst (C) may be utilized. In general, the use of the ammonium carboxylate compound (C1) is not limited, and may be utilized with any of the initial organosilicon compounds (A) described above. As such, in certain embodiments, the catalyst (C) comprises, alternatively is, the ammonium carboxylate compound (C1). In particular embodiments, the catalyst (C) comprises, alternatively is, the titanate compound (C2). Ammonium Carboxylate Compound (C1)

In certain embodiments, the catalyst (C) comprises the ammonium carboxylate compound (C1). The ammonium carboxylate compound (C1) is not particularly limited, and generally comprises the reaction product of an amine compound and a carboxylic acid. One of skill in the art will appreciate that the reaction of the amine compound and the carboxylic acid is generally an acid-base reaction, where the amine compound (i.e., a base) is protonated by the carboxylic acid to give an ammonium cation and a carboxylate anion, which are collectively referred to as the ammonium carboxylate compound, regardless of whether such ions are closely or transiently coordinated.

In general, suitable amine compounds include amino-functional organic compounds (e.g. amine-substituted hydrocarbon compounds). In particular, the amine compound typically comprises a moiety having the general formula:

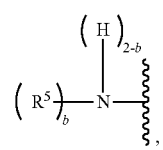

where each $R^5$ is an independently selected substituted or unsubstituted hydrocarbyl group having from 1 to 18 carbon atoms, and subscript b is 0, 1, or 2. Examples of hydrocarbyl groups suitable for $R^5$ include any of those described above. For example, in certain embodiments, each $R^5$ is a substituted or unsubstituted hydrocarbyl group having from 1 to 16, alternatively from 1 to 14, alternatively from 1 to 12, alternatively from 1 to 10, alternatively from 1 to 9, alternatively from 1 to 8, alternatively from 1 to 7 carbon atoms. In some such embodiments, each $R^5$ is a linear, branched, and/or cyclic alkyl group. In some embodiments, subscript b is 0, such that the amine compound is a primary amine. In other embodiments, subscript b is 1, such that the amine compound is a secondary amine. In additional embodiments, subscript b is 2, such that the amine compound is a tertiary amine.

In some embodiments, the amine compound is an organic amine having the general formula:

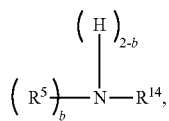

where each $R^5$ and subscript b are as defined above and $R^{14}$ is an independently selected substituted or unsubstituted hydrocarbyl group having from 1 to 22 carbon atoms. Examples of hydrocarbyl groups suitable for $R^{14}$ include any of those described above, such that $R^{14}$ may be the same as or different from any $R^5$, if present, of the amine compound. For example, in certain embodiments, $R^{14}$ is a substituted or unsubstituted hydrocarbyl group having from 1 to 20, alternatively from 2 to 20, alternatively from 2 to 18 carbon atoms. In particular embodiments, $R^{14}$ is a linear, branched, and/or cyclic alkyl group.

In particular embodiments, the amine compound is an organic amine having the general formula above where subscript b is 0 or 1, such that the amine compound may be defined as a primary or secondary organic amine, respectively. In some such embodiments, subscript b, each $R^5$, and $R^{14}$ are selected such that the amine compound comprises a total of from 3 to 20, alternatively from 4 to 20, alternatively from 5 to 20, alternatively from 5 to 18 carbon atoms. It is to be appreciated that the amine compound may be a cyclic amine, such as a secondary or tertiary amine with at least two nitrogen-bonded substituents being joined to one another in a ring structure (i.e., the amine compound may be a heterocyclic amine, such as a pyrrole, pyrrolidine, imidazole, thiazole, pyridine, piperidine, morpholine, etc.).

Typically, the amine compound is selected from volatile organic amines. For example, in certain embodiments the organic amine has a vaporization point of less than 300, alternatively less than 250, alternatively less than 240, alternatively less than 230, alternatively less than 220, alternatively less than 210, alternatively less than 200° C., at atmospheric pressure. It is to be understood that the term vaporization point, as used herein, refers to a temperature at which a compound in a solid or liquid phase is converted to a vapor/gaseous phase (e.g. via evaporation, sublimation, etc.). In this sense, the vaporization point may correspond to a boiling point of such a compound (e.g. where the compound is a liquid). In particular embodiments, the amine compound has a vaporization point of from 50 to 250, alternatively from 60 to 250, alternatively from 60 to 235, alternatively from 70 to 235, alternatively from 70 to 220° C., at atmospheric pressure.

Examples of particular amine compounds suitable for use in preparing the ammonium carboxylate compound (C1) include: alkylamines, such as aliphatic primary alkylamines including methylamine, ethylamine, propyl amines (e.g. n-propylamine, isopropylamine, etc.), butyl amines (e.g. n-butylamine, sec-butylamine, isobutylamine, t-butylamine, etc.), pentyl amines (e.g. pentylamine, 2-aminopentane, 3-aminopentane, 1-amino-2-methylbutane, 2-amino-2-methylbutane, 3-amino-2-methylbutane, 4-amino-2-methylbutane, etc.), hexylamines (e.g. hexylamine, 5-amino-2-methylpentane, etc.), heptylamines, octylamines, nonylamines, decylamines, undecylamines, dodecylamines, tridecylamines, tetradecylamines, pentadecylamines, hexadecylamines, heptadecylamines, octadecylamines, and the like; aliphatic secondary alkylamines, such as dimethylamine, diethylamine, dipropylamine, diisopropylamine, dibutylamine, diisobutylamine, di-sec-butylamine, di-tert-butylamine, dipentylamine, dihexylamine, diheptylamine, dioctylamine, dinonylamine, didecylamine, methylethylamine, methypropylamine, methylisopropylamine, methylbutylamine, methylisobutylamine, methyl-sec-butylamine, methyl-tert-butylamine, methylamylamine, methylisoamylamine, ethylpropylamine, ethylisopropylamine, ethylbutylamine, ethylisobutylamine, ethyl-sec-butylamine, ethyl-tert-butylamine, ethylisoamylamine, propylbutylamine, propylisobutylamine, and the like; as well as derivatives, modifications, and combinations thereof. For example, mixed secondary alkylamines (e.g. N-ethylisopropylamine, etc.), such as any of those comprising a combination of the alkyl groups listed in the above examples, may also be utilized. In particular embodiments, the amine compound comprises, alternatively is, octadecylamine and/or diethylamine.

In certain embodiments, the ammonium carboxylate compound (C1) comprises (i.e., is formed from) more than one amine compound, such as 2, 3, 4, or more amine compounds. In such embodiments, each amine compound is independently selected, and may be the same as or different from any amine compound of the ammonium carboxylate compound (C1).

In certain embodiments, the ammonium carboxylate compound (C1) comprises (i.e., is formed from) more than one amine compound, such as 2, 3, 4, or more amine compounds. In such embodiments, each amine compound is independently selected, and may be the same as or different from any amine compound of the ammonium carboxylate compound (C1). Likewise, the catalyst (C) may comprise more than one ammonium carboxylate compound (C1), such as such as 2, 3, 4, or more ammonium carboxylate compounds (C1). In such embodiments, the amine compound of each ammonium carboxylate compound (C1) is independently selected, and may independently complex, coordinate, ion pair, or otherwise associate with any carboxylic acid of the catalyst (C) (i.e., when the amine compound is protonated to a corresponding ammonium cation and the carboxylic acid is deprotonated to a corresponding carboxylate anion).

In general, suitable carboxylic acid compounds for use in preparing the ammonium carboxylate compound (C1) have the general formula:

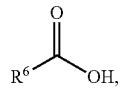

where $R^6$ is an independently selected substituted or unsubstituted hydrocarbyl group having from 1 to 18 carbon atoms. Examples of hydrocarbyl groups suitable for $R^6$ include any of those described above. For example, in certain embodiments, $R^6$ is a substituted or unsubstituted hydrocarbyl group having from 1 to 16, alternatively from 1 to 14, alternatively from 1 to 12 carbon atoms. In particular embodiments, $R^6$ is a linear, branched, and/or cyclic alkyl group. In some embodiments, $R^5$ is propyl or methyl.

Typically, the carboxylic acid is selected from volatile carboxylic acids. For example, in certain embodiments the carboxylic acid comprising a vaporization point of less than 300, alternatively less than 255, alternatively less than 240, alternatively less than 230, alternatively less than 220, alternatively less than 220, alternatively less than 200, alternatively less than 190, alternatively less than 180° C., at atmospheric pressure. In particular embodiments, the carboxylic acid has a boiling point of from 100 to 250, alternatively from 100 to 225, alternatively from 100 to 200, alternatively from 100 to 175, alternatively from 100 to 150° C., at atmospheric pressure.

Examples of particular carboxylic acids suitable for use in preparing the ammonium carboxylate compound (C1) include ethanoic acids (e.g. acetic acid), propanoic acids (e.g. propionic acid), butanoic acids (e.g. butyric acid), pentanoic acids (e.g. valeric acid), hexanoic acids (e.g. caproic acid), heptanoic acids (e.g. enanthic acid), octanoic acids (e.g. caprylic acid), nonanoic acids (e.g. pelargonic acid), decanoic acids (e.g. capric acid), and the like, as well as derivatives, modifications, and combinations thereof. In certain embodiments, the carboxylic acid is acetic acid and/or propionic acid, such that the ammonium carboxylate compound (C1) comprises acetate and/or propionate. While linear carboxylic acids are exemplified above, it will be appreciated that cyclic and/or branched carboxylic acids may also be utilized.

In certain embodiments, the ammonium carboxylate compound (C1) comprises (i.e., is formed from) more than one carboxylic acid, such as 2, 3, 4, or more carboxylic acids. In such embodiments, each carboxylic acid is independently selected, and may be the same as or different from any carboxylic acid of the ammonium carboxylate compound (C1). Likewise, the catalyst (C) may comprise more than one ammonium carboxylate compound (C1), such as such as 2, 3, 4, or more ammonium carboxylate compounds (C1). In such embodiments, the carboxylic acid of each ammonium carboxylate compound (C1) is independently selected, and may independently complex, coordinate, ion pair, or otherwise associate with any amine compound of the catalyst (C) (i.e., when the amine compound is protonated to a corresponding ammonium cation and the carboxylic acid is deprotonated to a corresponding carboxylate anion).

In certain embodiments, the catalyst (C) comprises the titanate compound (C2). Typically, the titanate compound (C2) is an organotitanium compound, such as a titanium (IV) complex comprising alkoxide and/or enolate-type ligands (i.e., a titanium chelate catalyst).

The titanate compound (C2) may comprise any combination of alkoxide and enolate-type ligands, which are described in further detail below, limited only by the particular ligands selected and the ability of the same to coordinate with titanium to give the titanate compound (C2). For example, the titanate compound (C2) may comprise one ligand that is the same as one, two, or each other ligand, e.g. in terms of ligand type, structure, etc. Likewise, the titanate compound (C2) may one or more ligand that is different from every other ligand. In certain embodiments, the titanate compound (C2) comprises at least one alkoxide ligand. In such embodiments, the titanate compound (C2) may comprise one, two, three, or four such alkoxide ligands, such that the titanate compound (C2) is a titanium mono-, di-, tri-, or tetraalkoxide, respectively. It is to be appreciated that the titanate compound (C2) may comprise a bidentate alkoxide ligand (e.g. a dialkoxide ligand) as well as the monoalkoxides described in detail herein.

In some embodiments, the titanate compound (C2) comprises at least one enolate-type ligand. Suitable enolate-type ligands are exemplified by enolates formed from parent beta-dicarbonyl compounds, such from beta-diketones (i.e., diones), beta-ketoesters, and/or beta-diesters, which may be referred to as a beta-dicarbonyl enolates. In such embodiments, the titanate compound (C2) may comprise two, three, or four such enolate-type ligands, such that the titanate compound (C2) is a titanium bis-, tris-, or tetrakis(beta-carbonyl enolate). In particular embodiments, the titanate compound (C2) comprises at least one alkoxide ligand and at least one beta-carbonyl enolate. It will be appreciated that the titanate compound (C2) may comprise multiple titanium complexes (e.g. due to ligand exchange, preparation, etc.), and thus may comprise, alternatively may be, a titanium tetrakis(beta-carbonyl enolate), titanium alkoxide tris(beta-carbonyl enolate), titanium dialkoxide bis(beta-carbonyl enolate), titanium trialkoxide (beta-carbonyl enolate), a titanium tetraalkoxide, or combinations thereof.

In particular embodiments, the titanate compound (C2) has the general formula $TiX_4$, where each X is independently of formula Y—CH—Y or —$OR^7$, wherein each Y is independently of formula $R^7C(O)$— or $R^7OC(O)$— and each $R^7$ is an independently selected hydrocarbyl group. As will be understood by those of skill in the art in view of the embodiments described herein, each X of formula —$OR^7$ may be defined as an alkoxide ligand and each X of formula Y—CH—Y may be defined as a beta-dicarbonyl enolate ligand. With regard to beta-dicarbonyl enolate ligands in particular, as introduced above, each Y is independently of formula $R^7C(O)$— or $R^7OC(O)$—. Accordingly, in certain embodiments, the titanate compound (C2) may comprise a ligand X selected from beta-diketo enolates of formula $R^7C(O)$—CH—$C(O)R^7$, beta-ketoester enolates of formula $R^7OC(O)$—CH—$C(O)R^7$, and beta-diester enolates of formula $R^7OC(O)$—CH—$C(O)R^7$.

In general, for any of ligands X described above, each $R^7$ is an independently selected substituted or unsubstituted hydrocarbyl group. Hydrocarbyl groups suitable for $R^7$ are exemplified by, and may include, any of those described above, as well as methyl, ethyl, trifluoromethyl, 4-methoxyphenyl, 4-chlorophenyl, tert-butyl, 2-pyridyl, heptafluoropropyl, isobutyl, 2-mesetylenyl, phenyl, benzyl, 2-thienyl, and 2-napthyl groups. Typically, each $R^7$ is independently selected from substituted and unsubstituted hydrocarbyl groups having from 1 to 18, alternatively from 1 to 10, alternatively from 1 to 8, alternatively from 1 to 6 carbon atoms. For example, in certain embodiments, each $R^7$ is independently selected from substituted, unsubstituted, linear, and/or branched methyl, propyl, butyl, pentyl, and hexyl groups.

Examples of titanium chelate catalysts suitable for use in or as the titanate compound (C2) include titanium methoxides, titanium ethoxides, titanium propoxides (e.g. titanium propoxide, titanium isopropoxide, etc.), titanium butoxides (e.g. titanium butoxide, titanium isobutoxide, titanium tert-butoxide etc.), titanium methylacetoacetates, titanium isopropylacetoatates, titanium butylacetoacetates, titanium acetylacetonates, and the like, as well as derivatives, modifications, and combinations thereof (e.g. titanium diisopropoxide bis(ethyl acetoacetate), titanium diisopropoxide bis(acetylacetonate), titanium dibutoxide bis(methyl acetoacetate), etc.).

Methods of preparing catalysts (C1) and (C2) are known in the art, with the catalysts themselves and/or compounds used to prepare the same being commercially available from various suppliers. As such, the catalyst (C) may be prepared as part of the method, or otherwise obtained (i.e., as a prepared compound). Preparing the catalyst (C) may be performed prior to the reaction of components (A) and (B), or in situ (i.e., during the reaction of components (A) and (B), e.g. via combining components of the catalyst (C) with components (A) and/or (B)). For example, in some embodiments, the method comprises combining the amine compound and the carboxylic acid compound with the initial organosilicon compound (A) and/or the alcohol component (B), thereby forming the ammonium carboxylate compound (C1) (i.e., the catalyst (C)), in situ.

The catalyst (C) may be utilized in any form, such as neat (i.e., absent solvents, carrier vehicles, diluents, etc.), or disposed in a carrier vehicle, such as a solvent or dispersant (e.g. such as any of those listed above with respect to the initial organosilicon compound (A) and/or the alcohol component (B)). In some embodiments, the catalyst (C) is utilized in a form absent water and/or carrier vehicles/volatiles reactive with the initial organosilicon compound (A), the alcohol component (B), and/or the catalyst (C) itself (i.e., until combined with components (A) and (B). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected (i.e., whether (C1) or (C2), the particular species utilized, etc.), the reaction parameters employed, the scale of the reaction (e.g. total amounts of components (A) and (B)), etc. The molar ratio of the catalyst (C) to components (A) and/or (B) utilized in the reaction may influence the rate and/or amount transalkoxylation to prepare the alkoxy-functional organosilicon compound. Thus, the amount of the catalyst (C) as compared to components (A) and/or (B), as well as the molar ratios therebetween, may vary. Typically, these relative amounts and the molar ratio are selected to maximize the transalkoxylation of component (A) to the alkoxy-functional organosilicon compound, while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.001 to 30 mol % based on the total amount of component (A) utilized. For example, the catalyst (C) may be used in an amount of from 0.005 to 25, alternatively of from 0.005 to 20, alternatively of from 0.01 to 20, mol % based on the total amount of component (A) utilized.

Typically, components (A) and (B) are reacted in a vessel or reactor to prepare the alkoxy-functional organosilicon compound. When the reaction is carried out at an elevated or reduced temperature as described below, the vessel or reactor may be heated or cooled in any suitable manner, e.g. via a jacket, mantle, exchanger, bath, coils, etc.

Components (A), (B), and (C) may be fed together or separately to the vessel, or may be disposed in the vessel in any order of addition, and in any combination. For example, in certain embodiments, components (B) and (C) are added to a vessel containing component (A). In such embodiments, components (B) and (C) may be first combined prior to the addition, or may be added to the vessel sequentially (e.g. (C) then (B)). In other embodiments, component (C) is added to a vessel containing components (A) and (B). In general, reference to the "reaction mixture" herein refers generally to a mixture comprising components (A), (B), and (C) (e.g. as obtained by combining such components, as described above).

The method may further comprise agitating the reaction mixture. The agitating may enhance mixing and contacting together components (A), (B), and (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., transalkoxylation), of the initial organosilicon compound (A) with the alcohol component (B) to form the alkoxy-functional organosilicon compound. Other conditions may be result-effective conditions for enhancing reaction yield or minimizing amount of a particular reaction by-product included within the reaction product along with the alkoxy-functional organosilicon compound.

In certain embodiments, the reaction of components (A) and (B) is carried out in the presence of a carrier vehicle or solvent, such as one or more of those described above. For example, portions of carrier vehicle or solvent may be added to or otherwise combined with the initial organosilicon compound (A), the alcohol component (B), and/or the catalyst (C) discretely, collectively with mixtures of components (A), (B), and/or (C), or with the reaction mixture as a whole. The total amount of carrier vehicle/solvent present in the reaction mixture will be selected by one of skill in the art, e.g. based on the particular component (A), (B), and/or (C) selected, the reaction parameters employed, etc.).

In certain embodiments, the reaction of components (A) and (B) is carried out in the absence of any carrier vehicle or solvent. For example, no carrier vehicle or solvent may be combined discretely with the initial organosilicon compound (A), the alcohol component (B), and/or the catalyst (C). In these or other embodiments, none of components (A), (B), and (C), are disposed in any carrier vehicle or solvent, such that no carrier vehicle or solvent is present in the reaction mixture during the transesterification (i.e., the reaction mixture is free from, alternatively substantially free from, solvents). The above notwithstanding, in certain embodiments, one of components (A), (B), and/or (C) may be a carrier, e.g. when utilized as a fluid in an amount sufficient to carry, dissolve, or disperse any other component of the reaction mixture. In specific embodiments, the alcohol component (B) is utilized as a carrier. Additionally, it will be appreciated that the transesterification of the initial organosilicon compound (A) with the alcohol component (B) results in the production of the alcohol of formula $R^1$—OH (hereinafter the "alcohol byproduct"), where $R^1$ is as defined above with respect to the initial organosilicon compound (A). The alcohol byproduct may itself be utilized as a carrier (i.e., once produced).

In certain embodiments, the alcohol byproduct is removed from the reaction mixture once produced. As understood in the art, transesterifications are reversible reactions, such that removing the alcohol byproduct from the reaction mixture influences the reaction in terms of selectivity in favor, and/or overall yields, of the alkoxy-functional organosilicon compound (e.g. by selectively driving the equilibrium of the reaction). Typically, the alcohol byproduct is volatile, or at least more volatile than components (A), (B), and/or (C) in the reaction mixture. The removal of the alcohol byproduct may include distillation, heating, applying reduced pressure/vacuum, azeotroping with solvents, utilizing molecular sieves, etc., and combinations thereof.

In certain embodiments, the alcohol byproduct is distilled from the reaction mixture during the reaction, such that the reaction is carried out under distillation conditions. The distillation conditions typically include (i) an elevated temperature; (ii) a reduced pressure; or (iii) both an elevated temperature and reduced pressure. By elevated or reduced, it is meant as compared to room temperature and atmospheric pressure. As understood in the art, the number of trays utilized in any distillation may be optimized, and may influence the rate and/or recovery of the alcohol byproduct with respect to the distillate produced. The distillation may be continuous or batched, and may include use of a solvent (e.g. hexane, toluene, etc.), such that the distillation may be an azeotropic distillation. The distillate comprising the azeotropic solvent utilized may be reused and/or recycled after removing the alcohol byproduct therefrom (e.g. via solvent phase extraction).

In some embodiments, the reaction is carried out at the elevated temperature. The elevated temperature will be selected and controlled depending on the particular initial organosilicon compound (A) selected, the particular the alcohol component (B) selected, the particular alcohol byproduct being produced (e.g. as a factor of substituent(s) $R^1O$— of component (A)), the reaction vessel selected (e.g. whether open to ambient pressure, sealed, under reduced pressure, etc.) and combinations thereof. Accordingly, the elevated temperature will be readily selected by one of skill in the art in view of the reaction conditions and parameters selected and the description herein. The elevated temperature is typically from greater than ambient temperature to 140° C., such as from 30 to 130, alternatively from 40 to 130, alternatively from 40 to 120, alternatively from 50 to 120, alternatively from 50 to 110, alternatively from 50 to 100, alternatively from 60 to 100° C.

In certain embodiments, the reaction is carried out at reduced pressure. The reduced pressure will be selected and controlled depending on the particular initial organosilicon compound (A) selected, the particular the alcohol component (B) selected, the particular alcohol byproduct being produced (e.g. as a factor of substituent(s) $R^1O$— of component (A)), and combinations thereof. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization byproducts when the $R^3$ of the initial organosilicon compound (A) comprises, alternatively is, an acryloxy group). Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A) and (B) to prepare the alkoxy-functional organosilicon compound is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 1 to 48, alternatively from 2 to 36, alternatively from 4 to 24, alternatively of 6, 12, 18, 24, 36, or 48 hours, as will be readily determined by one of skill in the art (e.g. by monitoring conversion of the initial organosilicon compound (A), production of the alkoxy-functional organosilicon compound, etc., such as via chromatographic and/or spectroscopic methods). In certain embodiments, the time during which the reaction is carried out is from greater than 0 to 48 hours, alternatively from 1 to 36 hours, alternatively from 1 to 24 hours, alternatively from 1 to 12 hours, alternatively from 2 to 12 hours, alternatively from 2 to 8 hours, after components (A) and (B) are combined in the presence of component (C).

Generally, the reaction of components (A) and (B) prepares a reaction product comprising the alkoxy-functional organosilicon compound. In particular, over the course of the reaction, the reaction mixture comprising components (A), (B), and (C) comprises increasing amounts of the alkoxy-functional organosilicon compound and decreasing amounts of components (A) and (B). Once the reaction is complete (e.g. one of components (A) and (B) is consumed, no additional alkoxy-functional organosilicon compound is being prepared, etc.), the reaction mixture may be referred to as a reaction product comprising the alkoxy-functional organosilicon compound. In this fashion, the reaction product typically includes any remaining amounts of components (A), (B), and (C), as well as degradation and/or reaction products thereof (e.g. materials which were not previously removed via any distillation, stripping, etc.). If the reaction is carried out in any carrier vehicle or solvent, the reaction product may also include such carrier vehicle or solvent. However, because the method is typically carried out neat (i.e., in the absence of added solvents) and performed under distillation and/or other heated conditions, this is typically not the case.

In certain embodiments, the method further comprises isolating and/or purifying the alkoxy-functional organosilicon compound from the reaction product. As used herein, isolating the alkoxy-functional organosilicon compound is typically defined as increasing the relative concentration of the alkoxy-functional organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the alkoxy-functional organosilicon compound, e.g. in the reaction product) and/or removing the alkoxy-functional organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the alkoxy-functional organosilicon compound. It is to be appreciated that isolating may include, and thus may be referred to as, purifying the alkoxy-functional organosilicon compound. However, purifying the alkoxy-functional organosilicon compound may comprise alternative and/or additional techniques as compared to those utilized in isolating the alkoxy-functional organosilicon compound. Regardless of the particular technique(s) selected, isolation and/or purification of alkoxy-functional organosilicon compound may be performed in sequence (i.e., in line) with the reaction itself, and thus may be automated. In other instances, purification may be a stand-alone procedure to which the reaction product comprising the alkoxy-functional organosilicon compound is subjected.

In particular embodiments, isolating the alkoxy-functional organosilicon compound comprises distilling and/or stripping volatiles from the reaction product. For example, in certain embodiments, such as where component (B) is used in excess of component (A), remaining amounts of component (B) are distilled and/or stripped from the reaction mixture comprising the alkoxy-functional organosilicon compound. In these or other embodiments, isolating the alkoxy-functional organosilicon compound comprises filtering the reaction product to remove remaining amounts of the catalyst (C) and/or solids formed therefrom. In both or either case (e.g. after removing components (B) and/or (C) via stripping/distillation and/or filtration), the reaction product may be referred to as a purified reaction product comprising the alkoxy-functional organosilicon compound.

In particular embodiments, the method further comprises purifying the alkoxy-functional organosilicon compound. Any suitable technique for purification may be utilized. In certain embodiments, purifying the alkoxy-functional organosilicon compound comprises distillation, to either remove the alkoxy-functional organosilicon compound (e.g. as a distillate) or to strip other compounds/components therefrom (i.e., leaving the alkoxy-functional organosilicon compound in the pot as a high-boiling component of the reaction mixture or purified reaction mixture. As will be appreciated by those of skill in the art, distilling the reaction product or purified reaction product to purify and/or isolate the alkoxy-functional organosilicon compound is typically carried out at an elevated temperature and a reduced pressure. The elevated temperature and reduced pressure are independently selected, e.g. based on the particular components of the reaction, the particular alkoxy-functional organosilicon compound prepared, other isolation/purification techniques utilized, etc. For example, any of the elevated temperatures and reduced pressures described herein may be utilized in purifying the alkoxy-functional organosilicon compound.

As will be appreciated by those of skill in the art in view of the description above, the particular alkoxy-functional organosilicon compound prepared in accordance with the method is a function of the particular initial organosilicon compound (A) and the alcohol component (B) utilized. According, in some embodiments, reacting components (A) and (B) in the presence of the catalyst (C) prepares an alkoxy-functional organosilicon compound having the general formula (I):

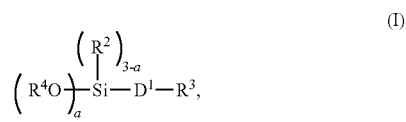

where each of $R^2$, $R^3$, $D^1$, and subscript a is defined above with respect to the initial organosilicon compound (A), and $R^4$ is defined above with respect to the alcohol component (B). For example, in certain embodiments each $R^2$ is an independently selected substituted or unsubstituted hydrocarbyl group; $R^3$ comprises an epoxide group, an ester group, an anhydride group, or an acryloxy group; each $R^4$ is an independently selected substituted or unsubstituted hydrocarbyl group; $D^1$ is a divalent linking group; and subscript a is 1, 2, or 3.

As will be understood by one of skill in the art in view of the description herein, the particular initial organosilicon compound (A) utilized in the method forms all of the alkoxy-functional organosilicon compound of general formula (I) with the exclusion of the alkoxy groups of formula ($R^4O$—), which are formed by the alcohol component (B) utilized. As such, where formulas, structures, moieties, groups, or other such motifs are shared between the alkoxy-functional organosilicon compound of formula (I) and components (A) and/or (B), the description above with respect to such shared motifs may equally describe the alkoxy-functional organosilicon compound prepared. However, the alkoxy-functional organosilicon compound prepared according to the method is not limited to the general formula (I) shown above, as described below.

In certain embodiments, reacting the initial organosilicon compound (A) and the alcohol component (B) in the presence of the catalyst (C) produces an intermediate alkoxy-functional organosilicon compound (i.e., via an "initial reaction"), and the method further comprises reacting the intermediate alkoxy-functional organosilicon compound with (D) an amino-functional organosiloxane compound, thereby preparing the alkoxy-functional organosilicon compound (i.e., via a "second reaction"). Said differently, in such embodiments, the alkoxy-functional organosilicon compound having the general formula (I) described above may be alternatively defined as an intermediate alkoxy-functional organosilicon compound, which is subsequently reacted with the amino-functional organosiloxane compound (D) to prepare the alkoxy-functional organosilicon compound. It is to be understood that, in such embodiments, the description above regarding reacting components (A) and (B), the reaction product prepared thereby, and isolating and/or purifying the alkoxy-functional organosilicon compound therefrom, may thus describe preparing, isolating, and/or purifying the intermediate alkoxy-functional organosilicon compound prepared according to the initial reaction. However, the intermediate alkoxy-functional organosilicon compound may be utilized at any time after preparation, such that no isolating and/or purifying procedures need be utilized. For example, the initial reaction and the second reaction may performed concurrently (e.g. in a one-pot reaction, etc.).

Amino-Functional Organosiloxane Compound (D)

The amino-functional organosiloxane compound (D) is not particularly limited, and may be any organosiloxane compound comprising an amine functional group (i.e., an amino group) suitable for bonding the organosiloxane compound to the functional group of $R^3$ described above with respect to the intermediate alkoxy-functional organosilicon compound (e.g. via a substitution reaction, displacement reaction, alkylation reaction, etc.), as will be understood by one of skill in the art in view of the description herein.

In general, the amino-functional organosiloxane compound (D) has the following general formula:

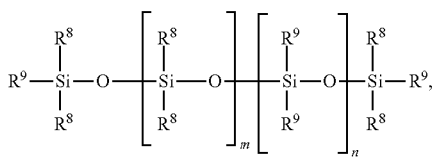

where each $R^8$ is an independently selected substituted or unsubstituted hydrocarbyl group; each $R^9$ is independently $R^8$ or an amino group of formula -$D^2$-$NH_2$, where $D^2$ is an independently selected divalent linking group, with the proviso that at least one $R^9$ is the amino group; subscript m is from 0 to 1000; and subscript n is from 1 to 100.

In general, hydrocarbyl groups suitable for $R^8$ include those described above, such as those described above with particular reference to $R^1$ and/or $R^2$ of the initial organosilicon compound (A). In specific embodiments, each $R^8$ is independently an alkyl group having from 1 to 10, alternatively from 1 to 8, alternatively from 1 to 6, alternatively from 1 to 4, alternatively from 1 to 3, alternatively from 1 to 2, alternatively 1, carbon atom(s). For example, in some such embodiments, each $R^8$ is methyl.

Each $R^9$ is independently selected from $R^8$ and amino groups of formula -$D^2$-$NH_2$. In general, each $D^2$ is independently a divalent linking group, and may be linear or branched and substituted or unsubstituted. Typically, $D^2$ is selected from divalent substituted or unsubstituted hydrocarbon groups, which may optionally be modified or substituted, e.g. with ether, ester, amino, and/or silyl groups. For example, in some embodiments, $D^2$ comprises a hydrocarbon moiety having the formula —$(CH_2)_c$—, where subscript c is ≥1, such as from 1 to 18, alternatively from 1 to 16, alternatively from 1 to 12, alternatively from 1 to 10, alternatively from 1 to 8, alternatively from 1 to 6, alternatively from 2 to 6. In these or other embodiments, $D^2$ may comprise a substituted hydrocarbon, i.e., a hydrocarbon group comprising a backbone substituted with (e.g. in and/or on the carbon chain) at least one heteroatom (e.g. O, N, S, etc.). For example, in some embodiments, $D^2$ is a hydrocarbon comprising one or more N atoms in, or bonded to one of the carbon atoms of, the backbone. In some such embodiments, $D^2$ may comprise, alternatively may be, an aminoalkyl moiety, such the amino group is a diamino group (i.e., at least one $R^9$ of the amino-functional organosiloxane compound (D) is a diamine).

As will be appreciated by those of skill in the art, subscripts m and n represent the number of siloxy units in, and thus the degree of polymerization (DP) of, the amino-functional organosiloxane compound (D). It will be appreciated that the siloxy units indicated by subscripts m and n may be in any order (e.g. randomized and/or block from, etc.) in the amino-functional organosiloxane compound (D).

In general, the amino-functional organosiloxane compound (D) has a DP of from 1 to 1100. In particular embodiments, the amino-functional organosiloxane compound (D) has a DP greater than 400, alternatively greater than 500, alternatively greater than 600, alternatively greater than 700, alternatively greater than 800. In some embodiments, the amino-functional organosiloxane compound (D) has a DP less than 400, alternatively less than 350, alternatively less than 300, alternatively less than 250, alternatively less than 200, alternatively less than 150, alternatively less than 100.

Subscript m is from (and including) 0 to 1000. In some embodiments, subscript m is from 1 to 1000, alternatively from 100 to 1000, alternatively from 200 to 1000, alternatively from 300 to 1000, alternatively from 400 to 1000, alternatively from 500 to 1000. In certain embodiments, subscript m is from 0 to 100, alternatively from 0 to 80, alternatively from 0 to 60, alternatively from 0 to 40, alternatively from 0 to 20, alternatively from 1 to 20. In particular embodiments, subscript m is 0.

Subscript n is from (and including) 1 to 100. In some embodiments, subscript n is from 1 to 90, alternatively from 1 to 80, alternatively from 1 to 70, alternatively from 1 to 60, alternatively from 1 to 50, alternatively from 1 to 40, alternatively from 1 to 30, alternatively from 1 to 20, alternatively from 2 to 20, alternatively from 3 to 20, alternatively from 4 to 20, alternatively from 5 to 20.

In general, the amino-functional organosiloxane compound (D) comprises at least one of the amino groups. However, in some embodiments, the amino-functional organosiloxane compound (D) comprises at least two, alternatively at least three, alternatively at least four, alternatively at least five of the amino groups. As will be understood by those of skill in the art, each $R^9$ is independently selected in each moiety indicated by subscript n, such that the amino-functional organosiloxane compound (D) may comprise a total of from 1 to n+2 number of the amino groups. For example, in certain embodiments, the amino-functional organosiloxane compound (D) comprises from 1 to 102 of the amino groups, such as from 1 to 100, alternatively from 1 to 90, alternatively from 1 to 80, alternatively from 1 to 70, alternatively from 1 to 60 of the amino groups. In these or other embodiments, the amino-functional organosiloxane compound (D) comprises from 1 to 20 of the amino groups, such as from 1 to 18, alternatively from 1 to 16, alternatively from 1 to 14, alternatively from 1 to 12, alternatively from 1 to 10 of the amino groups.

The amino-functional organosiloxane compound (D) may be utilized in any form, such as neat (i.e., absent solvents, carrier vehicles, diluents, etc.), or disposed in a carrier vehicle, such as a solvent or dispersant (e.g. such as any of those listed above). In some embodiments, the amino-functional organosiloxane compound (D is utilized in the absence of water and carrier vehicles/volatiles reactive with the intermediate alkoxy-functional organosilicon compound, the amino-functional organosiloxane compound (D) itself, and/or any other components utilized in the second reaction. For example, in certain embodiments, the method may comprise stripping the amino-functional organosiloxane compound (D) of volatiles and/or solvents (e.g. water, organic solvents, etc.) prior to reacting the same with the intermediate alkoxy-functional organosilicon compound. Techniques for stripping the amino-functional organosiloxane compound (D) are known in the art, and may include heating, drying, applying reduced pressure/vacuum, azeotroping with solvents, utilizing molecular sieves, etc., and combinations thereof.

In certain embodiments, the method comprises utilizing more than one amino-functional organosiloxane compound (D), such as 2, 3, 4, or more amino-functional organosiloxane compounds (D). In such embodiments, each amino-functional organosiloxane compound (D) is independently selected, and may be the same as or different from any other amino-functional organosiloxane compound (D).

The amino-functional organosiloxane compound (D) may be utilized in any amount, which will be selected by one of skill in the art, e.g. dependent upon the particular intermediate alkoxy-functional organosilicon compound and/or amino-functional organosiloxane compound (D) utilized, the reaction parameters employed, the scale of the reaction (e.g. total amounts of the intermediate alkoxy-functional organosilicon compound and/or component (D) to be reacted and/or the alkoxy-functional organosilicon compound to be prepared), etc. As will be understood by those of skill in the art in view of the description herein, the second reaction typically occurs at a maximum ratio of 1:1 [AG]:$R^3$, where [AG] represents the amino group of formula -$D^2$-$NH_2$ and $R^3$ is the functional group of the intermediate alkoxy-functional organosilicon compound as described above. As such, the intermediate alkoxy-functional organosilicon compound and the amino-functional organosiloxane compound (D) are typically reacted in a stoichiometric ratio of from 1.5:1 to 1:1.5, alternatively from 1.4:1 to 1:1.4, alternatively from 1.3:1 to 1:1.3, alternatively from 1.2:1 to 1:1.2, alternatively from 1.1:1 to 1:1.1, alternatively from 1.1:1 to 1:1 [AG]:$R^3$. In general, the amino-functional organosiloxane compound (D) is typically utilized at a molar amount equal to (e.g. where the component (D) comprises but 1 of the amino groups) or less than (e.g. where the component (D) comprises >1 of the amino groups) the amount of the intermediate alkoxy-functional organosilicon compound. However, an excess of one of the components is typically utilized to fully consume the intermediate alkoxy-functional organosilicon compound or the amino-functional organosiloxane compound (D), e.g. to simplify purification of the reaction product formed, etc. For example, in certain embodiments, component (D) is utilized in relative excess (e.g. in a stoichiometric ratio of 1:>1 [AG]:$R^3$) to maximize a conversion rate of the intermediate alkoxy-functional organosilicon compound to the alkoxy-functional organosilicon compound.

In certain embodiments, the intermediate alkoxy-functional organosilicon compound and the amino-functional organosiloxane compound (D) are reacted in the presence of (E) a catalyst (herein referred to as the "second catalyst" (E) for clarity). The second catalyst (E) is not limited, and may be any catalyst suitable for facilitating the bonding of the intermediate alkoxy-functional organosilicon compound to the organosiloxane of the amino-functional organosiloxane compound (D) (i.e., via the reaction amino groups of component (D) with the functional group $R^3$ of the intermediate alkoxy-functional organosilicon compound, e.g. via substitution reaction, displacement, alkylation, etc.), as will be understood by one of skill in the art in view of the description herein.

In certain embodiments, the second catalyst (E) is a base, such as carbonate base (e.g. $Na_2CO_3$, $CaCO_3$, $MgCO_3$, etc.), a hydroxide base (e.g. $Mg(OH)_2$, etc.), a metal oxide base (e.g. ZnO, MgO, etc.), an amine base (e.g. pyridine, etc.), and combinations thereof. In certain embodiments, the method comprises utilizing more than one second catalyst (E), such as 2 different second catalysts (E). In such embodiments, each second catalyst (E) is independently selected, and may be the same as or different from any other second catalyst (E) being utilized.

In particular embodiments, the intermediate alkoxy-functional organosilicon compound and the amino-functional organosiloxane compound (D) are reacted in the absence of any discreet second catalyst (E), e.g. such as when the amino-functional organosiloxane compound (D) is utilized in excess of the intermediate alkoxy-functional organosilicon compound and itself acts as a base (i.e., a basic catalyst) in the second reaction.

Methods of preparing compounds suitable for use in, or as, second catalyst (E) are well known in the art, and many of the compounds listed herein are commercially available from various suppliers. As such, the second catalyst (E) may be prepared as part of the method, or otherwise obtained (i.e., as a prepared compound).

The second catalyst (E) may be utilized in any form, such as neat (i.e., absent solvents, carrier vehicles, diluents, etc.), or disposed in a carrier vehicle, such as a solvent or dispersant (e.g. such as any of those listed above). In some embodiments, the second catalyst (E) is utilized in the absence of water and carrier vehicles/volatiles reactive with any of the components of the second reaction. For example, in certain embodiments, the method may comprise stripping the second catalyst (E) of volatiles and/or solvents (e.g. water, organic solvents, etc.). Techniques for stripping the second catalyst (E) are known in the art, and may include heating, drying, applying reduced pressure/vacuum, azeotroping with solvents, utilizing molecular sieves, etc., and combinations thereof.

The second catalyst (E) may be utilized in any amount, which will be selected by one of skill in the art, e.g. dependent upon the particular second catalyst (E) selected, the reaction parameters employed, the scale of the second reaction, etc. The molar ratio of the second catalyst (E) to the intermediate alkoxy-functional organosilicon compound and the amino-functional organosiloxane compound (D) utilized in the second reaction may influence the rate and/or amount of the reaction of these components to prepare the alkoxy-functional organosilicon compound therewith. Thus, the amount of the second catalyst (E) as compared to the intermediate alkoxy-functional organosilicon compound and the amino-functional organosiloxane compound (D), as well as the molar ratios therebetween, may vary. Typically, these relative amounts and the molar ratio are selected to maximize coupling of the intermediate alkoxy-functional organosilicon compound and the amino-functional organosiloxane compound (D) to prepare the alkoxy-functional organosilicon compound (e.g. for increased economic efficiency of the reaction, increased ease of purification of the reaction product formed, etc.).

In certain embodiments, the second catalyst (E) is utilized in a molar ratio of from 0.1 to 2 (D):(E). For example, in certain embodiments, the amino-functional organosiloxane compound (D) and the second catalyst (E) are utilized in a molar ratio of from 1:1 to 1:10, such as from 1:1.1 to 1:10, alternatively of from 1:1.2 to 1:10, alternatively of from 1:1.2 to 1:8, alternatively of from 1:1.2 to 1:6, alternatively of from 1:1.2 to 1:4, alternatively of from 1:1.1 to 1:2, (D):(E). It will be appreciated that ratios outside of these ranges may be utilized as well. For example, in certain embodiments, the second catalyst (E) is utilized in a gross excess (e.g. in an amount of ≥10, alternatively ≥15, alternatively ≥20, times the molar amount of the amino-functional organosiloxane compound (D)), such as when the second catalyst (E) is utilized as a carrier (i.e., a solvent, diluent, etc.) during the reaction.

Typically, the intermediate alkoxy-functional organosilicon compound and the amino-functional organosiloxane compound (D) are reacted in a vessel or reactor. As such, in some embodiments, the second reaction is carried out in a vessel that is the same, or same type of, vessel/reactor utilized to prepare the intermediate alkoxy-functional organosilicon compound. In other embodiments, the second reaction is carried out in a vessel that is different from the vessel/reactor utilized to prepare the intermediate alkoxy-functional organosilicon compound. In some embodiments, the second reaction is carried out the same vessel utilized for the initial reaction, such that the method may be defined or otherwise described as a continuous, in-line, or one-pot reaction. As with the initial reaction, the second reaction may be carried out at an elevated or reduced temperature as described below, and thus the vessel or reactor may be heated or cooled in any suitable manner, e.g. via a jacket, mantle, exchanger, bath, coils, etc.

The intermediate alkoxy-functional organosilicon compound and the amino-functional organosiloxane compound (D), and optionally the second catalyst (E), may be fed together or separately to the vessel, or may be disposed in the vessel in any order of addition, and in any combination. For example, in certain embodiments, component (D) is added to a vessel containing the intermediate alkoxy-functional organosilicon compound. In some embodiments, the intermediate alkoxy-functional organosilicon compound is added to a vessel containing component (D). In either of such embodiments, the second catalyst (E) may optionally be added to the vessel in isolation or combined with another component of the second reaction. In general, reference to the "second reaction mixture" herein refers generally to a mixture comprising the intermediate alkoxy-functional organosilicon compound and the amino-functional organosiloxane compound (D), and optionally the second catalyst (E) (e.g. as obtained by combining such components, as described above).

The method may further comprise agitating the second reaction mixture. The agitating may enhance mixing and contacting together the intermediate alkoxy-functional organosilicon compound and the amino-functional organosiloxane compound (D), and optionally the second catalyst (E), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus the second reaction of the intermediate alkoxy-functional organosilicon compound and the amino-functional organosiloxane compound (D) to form the alkoxy-functional organosilicon compound. Other conditions may be result-effective conditions for enhancing reaction yield or minimizing amount of a particular reaction by-product included within the second reaction product along with the alkoxy-functional organosilicon compound.

In certain embodiments, the second reaction is carried out in the presence of a carrier vehicle or solvent, such as one or more of those described above. For example, portions of carrier vehicle or solvent may be added to or otherwise combined with the intermediate alkoxy-functional organosilicon compound and/or the amino-functional organosiloxane compound (D) discretely, collectively with mixtures of the components utilized, or with the second reaction mixture as a whole. The total amount of carrier vehicle/solvent present in the second reaction mixture will be selected by one of skill in the art, e.g. based on the particular components selected, the reaction parameters employed, etc.).

In some embodiments, the second reaction is carried out at an elevated temperature. The elevated temperature will be selected and controlled depending on the particular intermediate alkoxy-functional organosilicon compound prepared and utilized, the particular amino-functional organosiloxane compound (D) selected, the particular carrier and/or solvent being utilized, if any, etc. Accordingly, the elevated temperature will be readily selected by one of skill in the art in view of the second reaction conditions and parameters selected and the description herein. The elevated temperature is typically from greater than ambient temperature to 200° C., such as from 30 to 180, alternatively from 60 to 180, alternatively from 90 to 180, alternatively from 120 to 180, ° C.

It is to be appreciated that the elevated temperature may also differ from the ranges set forth above, or be more specific subsets thereof. For example, in particular embodiments, the second reaction is carried out at an elevated temperature of from 110 to 120, alternatively from 120 to 130, alternatively from 130 to 140, alternatively from 140 to 150, alternatively from 150 to 160° C. It is also to be appreciated that reaction parameters may be modified during the second reaction as well. For example, temperature, pressure, and other parameters may be independently selected or modified during the second reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof). In certain embodiments, the second reaction is carried out at ambient temperature (e.g. when the second reaction is run over a long time scale, as described below).

The time during which the second reaction to prepare the alkoxy-functional organosilicon compound is carried out is a function of scale, reaction parameters and conditions, selection of particular components, etc. In certain embodiments, the time during which the second reaction is carried out is from greater than 0 to 48 hours, alternatively from 1 to 36 hours, alternatively from 6 to 36 hours, alternatively from 12 to 24 hours after the intermediate alkoxy-functional organosilicon compound and the amino-functional organosiloxane compound (D) are combined (e.g. in the presence of component (E), when utilized). In particular embodiments, the time during which the second reaction is carried out is from 0.5 to 24 hours, alternatively from 0.5 to 12 hours, alternatively from 1 to 12 hours, alternatively from 2 to 8 hours after the intermediate alkoxy-functional organosilicon compound and the amino-functional organosiloxane compound (D) are combined (e.g. in the presence of component (E), when utilized). It is to be appreciated that times outside these ranges may also be utilized, as will be understood by those of skill in the art. For example, in certain embodiments, the intermediate alkoxy-functional organosilicon compound and the amino-functional organosiloxane compound (D) are reacted over time scales around or longer than 48 hours (i.e., 2 days), such as from 2 to 60, alternatively from 2 to 30, alternatively from 4 to 21, alternatively from 7 to 21, alternatively from 7 to 14, days.

Generally, reacting the intermediate alkoxy-functional organosilicon compound and the amino-functional organosiloxane compound (D) prepares a second reaction product comprising the alkoxy-functional organosilicon compound. In particular, over the course of the second reaction, the second reaction mixture comprising the intermediate alkoxy-functional organosilicon compound and component (D) comprises increasing amounts of the alkoxy-functional organosilicon compound and decreasing amounts of the intermediate alkoxy-functional organosilicon compound and component (D). Once the second reaction is complete (e.g. one of the intermediate alkoxy-functional organosilicon compound and component (D) is consumed, no additional alkoxy-functional organosilicon compound is being prepared, etc.), the second reaction mixture may be referred to as a reaction product comprising the alkoxy-functional organosilicon compound (i.e., the "second reaction product"). In this fashion, the second reaction product typically includes any remaining amounts of the intermediate alkoxy-functional organosilicon compound and component (D), and any remaining amounts of components (A), (B), and/or (C) if carried over, as well as degradation and/or reaction products thereof (e.g. materials which were not previously removed via any distillation, stripping, etc.). If the second reaction is carried out in any carrier vehicle or solvent, the second reaction product may also include such carrier vehicle or solvent.

In certain embodiments, the method further comprises isolating and/or purifying the alkoxy-functional organosilicon compound from the second reaction product. Any suitable technique and/or protocol for isolation may be utilized, including any of those listed above. For example, in certain embodiments, such as where a carrier vehicle is utilized, volatiles are distilled and/or stripped from the second reaction mixture comprising the alkoxy-functional organosilicon compound. Once purified and/or isolated from the second reaction product, the alkoxy-functional organosilicon compound may be referred to as the isolated alkoxy-functional organosilicon compound.

As will be appreciated by those of skill in the art in view of the description above, the particular alkoxy-functional organosilicon compound prepared in accordance with the method is a function of the particular initial organosilicon compound (A) and the alcohol component (B) reacted, as well as whether the alkoxy-functional organosilicon compound thereby prepared is utilized as the intermediate alkoxy-functional organosilicon compound in the second reaction and, if so, the particular amino-functional organosiloxane compound (D) utilized. As such, in addition to the alkoxy-functional organosilicon compounds having the general formula (I) described above, in particular embodiments the method prepares alkoxy-functional organosilicon compounds having the following general formula (II):

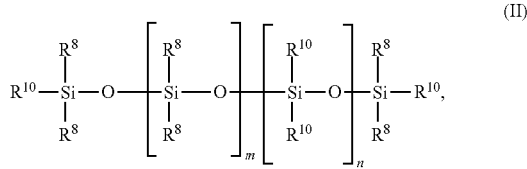

(II)

where each $R^8$ is an independently selected substituted or unsubstituted hydrocarbyl group; subscript m is from 0 to 1000; subscript n is from 1 to 100; and each $R^{10}$ is independently $R^8$, an amino group of formula $-D^2-NH_2$, or an amino group of formula $-D^2-N(H)Y$, with the proviso that at least one $R^{10}$ is an amino group of formula $-D^2-N(H)Y$; wherein each $D^2$ is an independently selected divalent linking group, and each Y comprises an independently selected alkoxysilyl moiety having the formula:

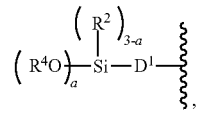

where each $R^2$ is an independently selected substituted or unsubstituted hydrocarbyl group; each $R^4$ is an independently selected substituted or unsubstituted hydrocarbyl group; $D^1$ is a divalent linking group; and subscript a is 1, 2, or 3.

As will be understood by one of skill in the art in view of the description herein, the amino-functional organosiloxane compound (D) utilized in the method (e.g. in the second reaction) forms the organosiloxane backbone of the alkoxy-functional organosilicon compound of general formula (II), and the intermediate alkoxy-functional organosilicon compound utilized forms the alkoxysilyl moieties Y. As such, where formulas, structures, moieties, groups, or other such motifs are shared between the alkoxy-functional organosilicon compound of formula (II) and the amino-functional organosiloxane compound (D) and the intermediate alkoxy-functional organosilicon compound, the description above with respect to such shared motifs may equally describe the alkoxy-functional organosilicon compound prepared.

A composition comprising the alkoxy-functional organosilicon compound is also provided. The composition generally comprises the alkoxy-functional organosilicon compound and at least one other component, such as a non-reactive component (e.g. a carrier vehicle, solvent, etc.), a reactive component (e.g. a compound reactive with, or capable of being made reactive with, the alkoxy-functional organosilicon compound), or combinations thereof. In some embodiments, the composition comprises the alkoxy-functional organosilicon compound of general formula (I) above. In these or other embodiments, the composition comprises the alkoxy-functional organosilicon compound of general formula (II) above. In certain embodiments, the composition comprises less than 0.1% cyclic polydiorganosiloxanes based on the total amount of components therein (e.g. wt. %, based on the total weight of the composition).

In general, the composition comprising the alkoxy-functional organosilicon compound may comprise, or be, the reaction product (or second reaction product) prepared according to the embodiments described above. In some embodiments however, the method includes purifying and/or isolating the alkoxy-functional organosilicon compound from the reaction product, and the composition thus comprises the isolated and/or purified alkoxy-functional organosilicon compound.

In particular embodiments, the method comprises preparing the reaction product comprising the intermediate alkoxy-functional organosilicon compound (i.e., of general formula (I)) with the catalyst (C1), removing the catalyst (C1) from the reaction product, and reacting the thus purified intermediate alkoxy-functional organosilicon compound to prepare the second reaction product comprising the alkoxy-functional organosilicon compound of general formula (II). In such embodiments, the second reaction product comprising the alkoxy-functional organosilicon compound comprises a cyclic polydiorganosiloxane content of less than 1, alternatively less than 0.8, alternatively less than 0.6, alternatively less than 0.4, alternatively less than 0.2, alternatively less than 0.1%, based on the total amount of components therein (e.g. wt. %, based on the total weight of the composition). In some such embodiments, the method further comprises preparing a composition comprising the alkoxy-functional organosilicon compound via combining the second reaction product comprising the alkoxy-functional organosilicon compound and at least one other component. In these embodiments, the composition comprises less than 0.1, alternatively less than 0.05%, alternatively less than 0.01%, % cyclic polydiorganosiloxanes based on the total amount of components therein (e.g. wt. %, based on the total weight of the composition).

The following examples, illustrating embodiments of this disclosure, are intended to illustrate and not to limit the invention. The brief summary immediately below provides information as to certain abbreviations, shorthand notations, and components utilized in the Examples.

The various components utilized in the Examples are set forth in Table 1 below.

TABLE 1

| Compounds Utilized in Examples 1-20 | | |
|---|---|---|
| Component | Description | Structure/Formula |
| Initial Organosilicon Compound (A1) | (3-glycidoxypropyl)trimethoxysilane | (structure) |
| Alcohol Component (B1) | Geraniol | (structure) |
| Alcohol Component (B2) | (2E,6Z)-nona-2,6-dien-1-ol | (structure) |
| Alcohol Component (B3) | Isoamyl alcohol | (structure) |
| Alcohol Component (B4) | Benzyl alcohol | (structure) |
| Alcohol Component (B5) | 2-octanol | (structure) |
| Alcohol Component (B6) | 2-methyl-2-butanol | (structure) |
| Amine Compound (C1-a1) | Octadecylamine | (structure) |
| Amine Compound (C1-a2) | Diethylamine | (structure) |
| Carboxylic Acid (C1-b1) | Propionic acid | (structure) |
| Carboxylic Acid (C1-b2) | Glacial acetic acid | (structure) |

TABLE 1-continued

Compounds Utilized in Examples 1-20

| Component | Description | Structure/Formula |
|---|---|---|
| Titanate Compound (C2-1) | Titanium(IV) butoxide | Ti(O$^n$Bu)$_4$ |
| Titanate Compound (C2-2) | Titanium(IV) tert-butoxide | Ti(O$^t$Bu)$_4$ |
| Amino-functional Organosiloxane Compound D | Aminopropyl-functional polydimethylsiloxane (viscosity = 520 mPa-s (25° C.); N content = 0.68 wt.%) | $H_3C-\underset{\underset{CH_3}{\vert}}{\overset{\overset{CH_3}{\vert}}{Si}}-O\left[\underset{\underset{CH_3}{\vert}}{\overset{\overset{CH_3}{\vert}}{Si}}-O\right]_x\left[\underset{\underset{CH_3}{\vert}}{\overset{\overset{(CH_2)_3-NH_2}{\vert}}{Si}}-O\right]_y\underset{\underset{CH_3}{\vert}}{\overset{\overset{CH_3}{\vert}}{Si}}-CH_3$ |

In each of the Examples below, viscosity is determined by loading a sample into a cup, letting the cup stand for one minute to reach room temperature, and then measuring the viscosity of the sample on a Brookfield DV-Ill viscometer at 25° C., with rpm adjusted to reach a stress of from 45-55%.

Example 1: Preparation of Alkoxy-Functional Organosilicon Compound with an Ammonium Carboxylate Catalyst A glass vial equipped with a magnetic stir bar is charged with Initial Organosilicon Compound (A1) (2.5 g. 10 mmol, 1 eq.) and Alcohol Component (B1) (4.9 g, 30 mmol, 3 eq.). Amine Compound (C1-a1) (150 mg, 0.56 mmol, 2 wt. %) and Carboxylic Acid (C1-b1) (42 µL, 0.56 mmol) are then added to the vial to form a reaction mixture, which is then heated to and held at 80° C. for 16 h. A sample of the reaction mixture is then analyzed via $^1$H NMR to show ~40% Alcohol Component (B1) bound to the Initial Organosilicon Compound (A1), with intact epoxide functionality. The reaction mixture is then placed on a rotary evaporator under full vacuum, and heated to and held at 80° C. for 1 h, then 100° C. for 1 h. Another sample of the reaction mixture is then analyzed via $^1$H NMR to show that all methanol has been evaporated, but no further conversion transformation had occurred (~44% Alcohol Component (B1) bound to the Initial Organosilicon Compound (A1)). The reaction mixture is then placed in a heating block at 80° C. and left for 7 h exposed to ambient air give a reaction product comprising an alkoxy-functional organosilicon compound (~70% Alcohol Component (B1) bound to the Initial Organosilicon Compound (A1) with intact epoxide functionality, via $^1$H NMR).

Example 2: Preparation of Alkoxy-Functional Organosilicon Compound with an Ammonium Carboxylate Catalyst A glass vial equipped with a magnetic stir bar is charged with Initial Organosilicon Compound (A1) (2.5 g. 10 mmol, 1 eq.) and Alcohol Component (B1) (3.2 g, 20 mmol, 2 eq.). Amine Compound (C1-a1) (75 mg, 0.28 mmol, 1 wt. %) and Carboxylic Acid (C1-b1) (21 µL, 0.28 mmol) are then added to the vial to form a reaction mixture. The vial is sealed, and the reaction mixture is heated to and held at 80° C. for 1 h. A sample of the reaction mixture is then analyzed via $^1$H NMR to show ~26% Alcohol Component (B1) bound to the Initial Organosilicon Compound (A1). The reaction mixture is then held at 80° C. for one additional hour to give a reaction product comprising an alkoxy-functional organosilicon compound (~28% Alcohol Component (B1) bound to the Initial Organosilicon Compound (A1) with intact epoxide functionality, via $^1$H NMR).

Example 3: Preparation of Alkoxy-Functional Organosilicon Compound with an Ammonium Carboxylate Catalyst A glass vial equipped with a magnetic stir bar and nitrogen inlet is charged with Initial Organosilicon Compound (A1) (2.5 g. 10 mmol, 1 eq.) and Alcohol Component (B1) (4.9 g, 30 mmol, 3 eq.). Amine Compound (C1-a2)(40 mg, 0.56 mmol) and Carboxylic Acid (C1-b1) (41 µL, 0.56 mmol) are then added to the vial to form a reaction mixture. The reaction mixture is placed under nitrogen and heated to and held at 100° C. for 2 h. A sample of the reaction mixture is then analyzed via $^1$H NMR to show ~36% Alcohol Component (B1) bound to the Initial Organosilicon Compound (A1). The reaction mixture is then held at 100° C. for another 18 h, and another sample of the reaction mixture is analyzed via $^1$H NMR to show ~63% Alcohol Component (B1) bound to the Initial Organosilicon Compound (A1). The reaction mixture is then heated to and held at 120° C. for 16 h to give an orange reaction mixture, which is then stripped under vacuum (rotary evaporator) at 130° C. for 2 h to give a reaction product comprising an alkoxy-functional organosilicon compound (~75% Alcohol Component (B1) bound to the Initial Organosilicon Compound (A1) with intact epoxide functionality, via $^1$H NMR).

Example 4: Preparation of Alkoxy-Functional Organosilicon Compound with a Titanate Catalyst A glass vial equipped with a magnetic stir bar and nitrogen inlet is charged with Initial Organosilicon Compound (A1) (2.5 g. 10 mmol, 1 eq.) and Alcohol Component (B1) (4.8 g, 30 mmol, 3 eq.). Titanate Compound (C2-1) (70 mg) is then added to the vial to form a reaction mixture, which is then heated to and held at 60° C. on a rotary evaporator for 4 h to give a reaction product comprising an alkoxy-functional organosilicon compound (~97% Alcohol Component (B1) bound to the Initial Organosilicon Compound (A1) with intact epoxide functionality, via $^1$H NMR).

Examples 5-16: Preparation of Alkoxy-Functional Organosilicon Compounds with Titanate Catalysts

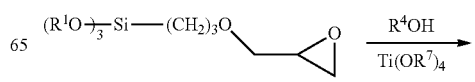

-continued

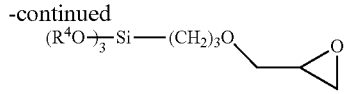

For each of Examples 5-16, a glass vial equipped with a magnetic stir bar and nitrogen inlet is charged with Initial Organosilicon Compound (A1) (1.5 g, 6.3 mmol, 1 eq.) and an Alcohol Component (B). A Titanate Compound (C2) (25 mg, 7.3 mmol, 1.1 mol %) is then added to the vial to form a reaction mixture, which is then heated to and held at 80° C. on a rotary evaporator for 4 h to give a reaction product comprising an alkoxy-functional organosilicon compound, which is then analyzed via $^1$H NMR to confirm the epoxide functionality of the initial organosilicon compound remains intact during the conversation to the alkoxy-functional organosilicon compound.

TABLE 3

Examples 5-10

| | Example: | | | | | |
|---|---|---|---|---|---|---|
| | 5 | 6 | 7 | 8 | 9 | 10 |
| Alcohol Component (B): | B1 | B2 | B3 | B4 | B5 | B6 |
| Equivalents (B): | 3 | 3 | 6 | 3 | 3 | 3 |
| Titanate Compound (C2): | C2-1 | C2-1 | C2-1 | C2-1 | C2-1 | C2-1 |
| Conv. (%) ($^1$H NMR): | 96 | 98 | 88 | 96 | 78 | 100 |
| Epoxide Intact ($^1$H NMR): | Yes | Yes | Yes | Yes | Yes | Yes |

TABLE 4

Examples 11-16

| | Example: | | | | | |
|---|---|---|---|---|---|---|
| | 11 | 12 | 13 | 14 | 15 | 16 |
| Alcohol Component (B): | B1 | B2 | B3 | B4 | B5 | B6 |
| Equivalents (B): | 3 | 3 | 6 | 3 | 3 | 3 |
| Titanate Compound (C2): | C2-2 | C2-2 | C2-2 | C2-2 | C2-2 | C2-2 |
| Conv. (%) ($^1$H NMR): | 98 | 99 | 86 | 95 | 84 | 100 |
| Epoxide Intact* ($^1$H NMR): | Yes | Yes | Yes | Yes | Yes | Yes |

Example 17: Preparation of an Alkoxy-Functional Organosilicon Compound

A mixing cup is charged with Amino-functional Organosiloxane Compound (D) (5 g), water (deionized; 0.5 g), and an emulsification component (polyoxyethylene (12) tridecanol; 100% active; 0.4 g) and placed in a high-speed mixer (SpeedMixer; DAC 150). The cup is then spun (2×30 second cycles; maximum speed), and charged with water (incremental additions; 4.1 g) to give an emulsion comprising the Amino-functional Organosiloxane Compound (D) (amino-functional organosiloxane content=50%; pH 9.5) having a particle size of Dv(50)=0.39 μm and Dv(90)=0.885 μm (via laser diffraction particle size analyzer; Malvern Mastersizer 3000).

The emulsion comprising the Amino-functional Organosiloxane Compound (D) (10 g; 4.9 mmol N; 1 equiv) is then combined with the Alkoxy-functional Organosilicon Compound prepared in Example 8, the resulting combination mixed (dental mixer), and the mixture oven-dried (45° C.; 8 days) to give a composition comprising an akoxy-functional organosilicon compound (emulsion; particle size: Dv(50)=0.246 μm and Dv(90)=0.602 μm), which is allowed to cool to room temperature and then transferred to a capped glass bottle containing CaCl$_2$ (1.5 g; pellets). The bottle is then vigorously stirred. The composition is then diluted four times via charging the bottle with pentane (25 mL) and methanol (20 mL), and stirred with venting (via cracking open the cap) between each dilution to give the diluted composition as an opaque mixture. The opaque mixture is then transferred to a centrifuge tube (50 mL), centrifuged (6000 rpm; for 15 minutes), shaken vigorously, and centrifuged again (6000 rpm; for 15 minutes) to give a phase-separated mixture. The non-polar phase of the phase-separated mixture (top layer) is then isolated and solvent-stripped (rotary evaporator) to give a reaction product comprising an alkoxy-functional organosilicon compound (free-flowing; slightly yellow; viscosity=728 mPa-s (25° C.)). A sample of the reaction product is then analyzed via $^1$H NMR to show ring-opening of the epoxide functionality.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

The invention claimed is:

1. A method of preparing an alkoxy-functional organosilicon compound, said method comprising:
    reacting via transalkoxylation (A) an initial organosilicon compound having at least one alkoxysilyl group and an epoxide group, an ester group, an anhydride group, or an acryloxy group and (B) an alcohol component comprising an organic alcohol in the presence of (C) a catalyst comprising (C1) an ammonium carboxylate compound, thereby preparing the alkoxy-functional organosilicon compound.

2. The method of claim 1, wherein the at least one alkoxysilyl group of the initial organosilicon compound (A) has the general formula:

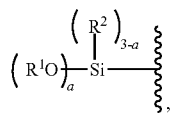

where each $R^1$ is an independently selected hydrocarbyl group having from 1 to 18 carbon atoms;
each $R^2$ is an independently selected substituted or unsubstituted hydrocarbyl group; and subscript a is 1, 2, or 3.

3. The method of claim 1, wherein the initial organosilicon compound (A) has the general formula:

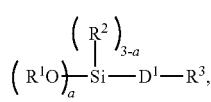

where each $R^1$ is an independently selected hydrocarbyl group having from 1 to 18 carbon atoms;
each $R^2$ is an independently selected substituted or unsubstituted hydrocarbyl group; $R^3$ comprises an epoxide group, an ester group, an anhydride group, or an acryloxy group; $D^1$ is a divalent linking group; and subscript a is 1, 2, or 3.

4. The method of claim 1, wherein the organic alcohol of the alcohol component (B) has the formula $R^4OH$, where $R^4$ is an independently selected substituted or unsubstituted hydrocarbyl group.

5. The method of claim 1, wherein the ammonium carboxylate compound (C1) comprises the reaction product of an amine compound and a carboxylic acid.

6. The method of claim 5, wherein:
    i) the amine compound comprises a moiety having the general formula:

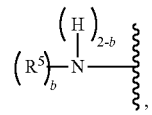

where each $R^5$ is an independently selected substituted or unsubstituted hydrocarbyl group having from 1 to 18 carbon atoms, and subscript b is 0, 1, or 2;
    ii) the amine compound has a vaporization point of from 50 to 300 °C. at atmospheric pressure; or
    iii) both i) and ii).

7. The method of claim 5, wherein:
    i) the carboxylic acid has the general formula:

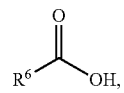

where $R^6$ is an independently selected substituted or unsubstituted hydrocarbyl group having from 1 to 18 carbon atoms;
    ii) the carboxylic acid has a vaporization point of from 100 to 300 °C. at atmospheric pressure; or
    iii) both i) and ii).

8. The method of claim 5, wherein the ammonium carboxylate compound (C1) comprises:
    (i) acetate;
    (ii) propionate; or
    (iii) both (i) and (ii).

9. The method of claim 1, wherein reacting the initial organosilicon compound (A) and the alcohol component (B) in the presence of the catalyst (C) produces an intermediate alkoxy-functional organosilicon compound, and wherein the method further comprises reacting the intermediate alkoxy-functional organosilicon compound with (D) an amino-functional organosiloxane compound, thereby preparing the alkoxy-functional organosilicon compound.

10. The method of claim 9, wherein the intermediate alkoxy-functional organosilicon compound has the general formula:

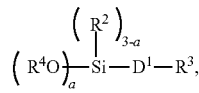

where each $R^2$ is an independently selected substituted or unsubstituted hydrocarbyl group; R3 comprises an epoxide group, an ester group, an anhydride group, or an acryloxy group; each R4 is an independently selected substituted or unsubstituted hydrocarbyl group; D1 is a divalent linking group; and subscript a is 1, 2, or 3.

11. The method of claim 9, wherein the amino-functional organosiloxane compound (D) has the general formula:

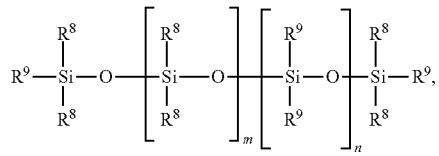

where each $R^8$ is an independently selected substituted or unsubstituted hydrocarbyl group; each $R^9$ is independently $R^8$ or an amino group of formula —$D^2NH_2$, where $D^2$ is an independently selected divalent linking group, with the proviso that at least one $R^9$ is the amino group; subscript m is from 0 to 1000; and subscript n is from 1 to 100.

12. A reaction product comprising the alkoxy-functional organosilicon compound prepared in accordance with the method of claim 1; wherein the alkoxy-functional organosilicon compound has the general formula:

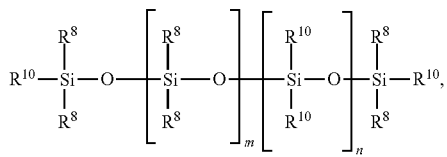

where each $R^8$ is an independently selected substituted or unsubstituted hydrocarbyl group; subscript m is from 0 to 1000; subscript n is from 1 to 100; and each $R^{10}$ is independently $R^8$, an amino group of formula —$D^2$—$NH_2$, or an amino group of formula —$D^2$—N(H)Y, with the proviso that at least one $R^{10}$ is an amino group of formula —$D^2$—N(H)Y; wherein each $D^2$ is an independently selected divalent linking group, and each Y comprises an independently selected alkoxysilyl moiety having the formula:

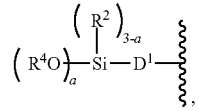

where each $R^2$ is an independently selected substituted or unsubstituted hydrocarbyl group; each $R^4$ is an independently selected substituted or unsubstituted hydrocarbyl group, with the proviso that two of $R^4$ are different from one another in the same molecule; $D^1$ s a divalent linking group; and subscript a is 2 or 3.

13. A composition comprising the reaction product of claim 12, and less than 0.1 % cyclic polydiorganosiloxanes.

* * * * *